(12) United States Patent
Wood, III et al.

(10) Patent No.: US 10,910,628 B2
(45) Date of Patent: Feb. 2, 2021

(54) FAST FORMATION CYCLING FOR RECHARGEABLE BATTERIES

(71) Applicant: UT-BATTELLE, LLC, Oakridge, TN (US)

(72) Inventors: David L. Wood, III, Knoxville, TN (US); Jianlin Li, Knoxville, TN (US); Seong Jin An, Suwon-si (KR)

(73) Assignee: UT-BATTELLE, LLC, Oak Ridge, TN (US)

(*) Notice: Subject to any disclaimer, the term of this patent is extended or adjusted under 35 U.S.C. 154(b) by 147 days.

(21) Appl. No.: 16/225,889

(22) Filed: Dec. 19, 2018

(65) Prior Publication Data

US 2019/0198856 A1    Jun. 27, 2019

Related U.S. Application Data

(60) Provisional application No. 62/609,376, filed on Dec. 22, 2017.

(51) Int. Cl.

| | |
|---|---|
| *H01M 4/04* | (2006.01) |
| *H02J 7/00* | (2006.01) |
| *H01M 10/0525* | (2010.01) |
| *H01M 4/587* | (2010.01) |
| *H01M 4/505* | (2010.01) |
| *H01M 4/525* | (2010.01) |
| *H01M 10/44* | (2006.01) |

(52) U.S. Cl.
CPC ....... *H01M 4/0447* (2013.01); *H01M 4/0445* (2013.01); *H01M 4/505* (2013.01); *H01M 4/525* (2013.01); *H01M 4/587* (2013.01); *H01M 10/0525* (2013.01); *H01M 10/44* (2013.01); *H01M 10/446* (2013.01); *H02J 7/0068* (2013.01)

(58) Field of Classification Search
None
See application file for complete search history.

(56) References Cited

PUBLICATIONS

Jin An, et al., "Fast formation cycling for lithium ion batteries", May 2017, J. Power Sources, 342, 846-852.*
Jin An, et al. "Fast formation cycling for lithium ion batteries",May 2017, J. Power Sources, 342, addendum.*
Lee et al."A fast formation process for lithium batteries", Journal of Power Sources, 134 (2004) 118-123.

(Continued)

*Primary Examiner* — Daniel S Gatewood
(74) *Attorney, Agent, or Firm* — Fox Rothschild LLP

(57) ABSTRACT

A method for fast formation cycling for rechargeable batteries comprising the steps of: step 1 (First Partial Charge)—charge cell from open-circuit voltage (OVC) up to 80-90% of an upper cutoff voltage (UCV) of from 4-5 V at a C rate not less than 0.5 and not more than 1.5; step 2 (First Shallow Charge)—charge cell from 80-90% of UCV to 97-100% of UCV at a C rate of not less than 0.2 and not more than 0.5; step 3 (First Shallow Discharge)—discharge cell from 97-100% of UCV to 80-90% of UCV at a C rate of not less than 0.2 and not more than 0.5; and step 4 (Subsequent Charge/Discharge Cycles)—repeat steps 2-3 up to 2-10 times where the charging and discharging rates are progressively increased by 25-75%. A battery made according to the method of the invention is also disclosed.

39 Claims, 23 Drawing Sheets

(56) References Cited

PUBLICATIONS

Bhattacharya et al.: "Micromechanisms of solid electrolyte interphase formation on electrochemically cycled graphite electrodes in lithium-ion cells", Carbon vol. 50, Issue 15, Dec. 2012, pp. 5359-5371.

Bhattacharya et al.: "Role of Voltage Scan Rate on Degradation of Graphite Electrodes Electrochemically Cycled vs. Li/Li+", MRS Proceedings, 1388 (2012) 1-6.

* cited by examiner

FAST FORMATION CYCLING FOR RECHARGEABLE BATTERIES

CROSS-REFERENCE TO RELATED APPLICATIONS

This application claims priority to U.S. Provisional Patent Application No. 62/609,376 filed on Dec. 22, 2017, entitled "Fast Formation Cycling for Rechargeable Batteries", the entire disclosure of which incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention is directed to the manufacture of rechargeable batteries, and more particularly to protocols for the formation of a stable solid electrolyte interphase (SEI).

BACKGROUND OF THE INVENTION

Lithium-ion batteries (LIBs) are common power sources for portable electric devices and attractive for electric vehicle applications. Increasing energy density of LIBs has been a major focus of recent research, with many scientists developing and improving cathode materials (e.g. higher nickel contents) and anode materials (e.g. silicon or tin composites) for high voltage and high energy LIBs. Concurrently, reducing LIB production cost without sacrificing cell performance is another focus especially for electrical vehicle applications. One of the largest contributors to processing cost during LIB production is the electrolyte interphase formation step.

The solid electrolyte interphase (SEI) acts as a protective layer to impede continuous electrolyte decomposition and solvent co-intercalation into graphitic layers during subsequent cycles. This passivation layer is electrically resistive but ionically conductive. Imperfect SEI layers could expose fresh graphite to the electrolyte, cause continuous electrolyte decomposition, and lead to graphite exfoliation. The cell formation protocol is, therefore, essential to create a stable SEI layer and minimize active lithium loss, electrolyte depletion, and capacity fade over the lifetime of the battery.

The anode solid electrolyte interphase (SEI) and cathode electrolyte interphase (CEI) form when the electrolyte is accessible to electrons at the electrode and, simultaneously the electrolyte experiences an unstable voltage range. During a charging cycle, the electrolyte decomposes and precipitates at low potentials at the anode via reduction reactions and at high potential on cathode via oxidation reactions. Irreversible capacity loss indicating electrolyte interphase formation is the highest after the first charge/discharge cycle (ca. 10% in the case of graphite anode), significantly lower after the second cycle, and even lower after the third cycle and so on (less than 0.05%). The irreversible capacity loss varies depending on such factors as the negative-to-positive capacity ratio, electrode materials, surface area of particles, electrolyte, and operation conditions.

Most solid electrolyte interphase (SEI) forms during the first charge/discharge cycle because the pristine anode and cathode do not have previously formed passivation layers that electronically insulate the electrode from the electrolyte. If after the first cycle, the anode graphite was not significantly exfoliated, further cycling results in significantly lower electrolyte interphase formation because the pre-formed interphase layer (from the first charging cycle) impedes solvent molecule diffusion towards the electrode surface and electron transfer between the electrode and electrolyte.

The manufacturing cost of cell formation scales with the required length of time. Besides material cost, the electrolyte wetting and SEI formation steps are the most expensive processes because of the slow wetting and slow charge/discharge rates, for example 3-5 cycles at C-rate of C/20 and 3-5 cycles at higher C-rate at a higher temperature. This process may take up to 1.5-3 weeks, depending on the cell manufacturer and cell chemistry, requiring a tremendous number of charge/discharge cycles for mass production of LIBs, large floor space, and intense energy for the cyclers and environmental chambers. These processes are a major production bottleneck; therefore, it is important to reduce wetting and formation time for cost and production rate benefits.

Complete wetting of the active material and separator with electrolyte is typically a slow process (hours to days). After wetting, the first charge/discharge cycle(s) is at low rate to ensure formation of a robust SEI and avoid lithium plating. Typical formation protocols found in the academic literature include 3 to 5 cycles at a C-rate of C/10 to C/20. In an industrial setting, the formation protocol may be faster but remains a bottleneck for production. The formation step in battery manufacturing requires a tremendous number of battery cyclers, which occupy a sizeable footprint and consume considerable energy. Therefore, it is important to reduce formation time to increase production rate and lower cost.

There have been several electrolyte interphase formation studies that attempted to reduce the required time. For example, skipping the high state-of-charge (SOC) region reduced formation time, but it also resulted in a decrease in capacity retention. Increasing C-rates also reduced formation time. However, it generally caused negative effects on electrolyte interphase formation such as non-uniform thickness and discontinuity of the layer on the anode. Formation at high voltage (4.2 V) has rarely been reported, although high-voltage operation is beneficial for high-energy batteries.

SUMMARY OF THE INVENTION

A method for fast formation cycling for rechargeable batteries comprising the steps of: step 1 (First Partial Charge)—charge cell from open-circuit voltage (OCV) up to 80-90% of an upper cutoff voltage (UCV) of from 4-5 V at a C rate not less than 0.5 C and not more than 1.5 C; step 2 (First Shallow Charge)—charge cell from 80-90% of UCV to 97-100% of UCV at a C rate of not less than 0.2 C and not more than 0.5 C; step 3 (First Shallow Discharge)—discharge cell from 97-100% of UCV to 80-90% of UCV at a C rate of not less than 0.2 C and not more than 0.5 C; and step 4 (Subsequent Charge/Discharge Cycles)—repeat steps 2-3 up to 2-10 times where the charging and discharging rates are progressively increased by 25-75%.

The invention is suitable for a number of lithium battery cathode chemistries combined with graphite. These include $LiNi_xMn_yCo_{1-x-y}O_2$ (NMC)/Graphite, where x≤1.0 and y≤01.0, $LiNi_xMn_yCo_{1-x-y}O_2$ (NMC)/Graphite, where x≤0.5 and y≤0.4, $LiNi_xMn_yCo_{1-x-y}O_2$ (NMC)/Graphite, where 0.5<x≤0.8 and 0.1≤y<0.4, $LiFePO_4$, $LiNi_xCo_yAl_{1-x-y}O_2$ where 0.5<x≤0.85 and 0.1≤y<0.25, $LiCoO_2$, $Li_{1+x}Ni_yMn_zCo_{1-x-y-z}O_2$, where 0.01≤x≤0.2, 0.1≤y<0.3 and 0.4<z≤0.65, and $LiNi_xFe_yAl_{1-x-y}O_2$ where 0.5<x≤0.8 and 0.1≤y<0.4. Other battery chemistries are possible, especially at the anode where the graphite may be mixed with up to 80 wt % Si.

A battery made according to the method of the invention is also disclosed. The performance of cells should preferably meet acceptable standards. These include no less than 95% rated capacity retention after 100 0.33C/−0.33C cycles, and no less than 80% rated capacity retention after 1000 0.33C/−0.33C cycles.

BRIEF DESCRIPTION OF THE DRAWINGS

There are shown in the drawings embodiments that are presently preferred it being understood that the invention is not limited to the arrangements and instrumentalities shown, wherein:

FIG. 1A is cell voltage profiles from a baseline and FIG. 1B is SEI formation protocol according to the invention.

DETAILED DESCRIPTION OF THE INVENTION

Figure 1A:
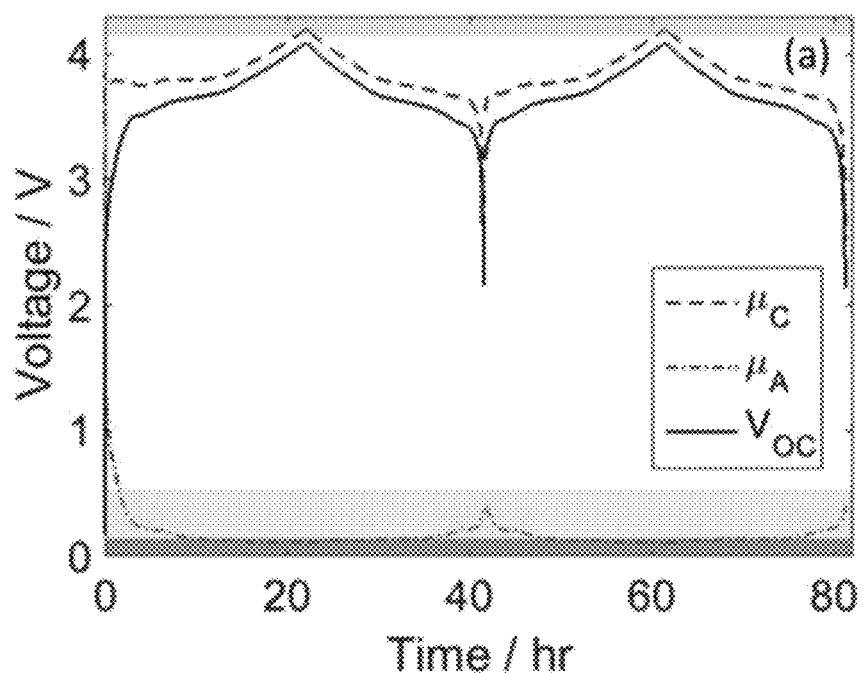
FIG. 1A and FIG. 1B present a typical cathode potential ($\mu_C$), anode potential ($\mu_A$), and voltage between anode and cathode ($V_{OC}$) from a three-electrode pouch cell (graphite anode/Li reference/$Li_{1.02}Ni_{0.50}Mn_{0.29}Co_{0.19}O_2$ cathode) with potential ranges where the electrolyte is not stable.

The formation process for lithium ion batteries typically takes several days or more, and it is necessary for providing a stable solid electrolyte interphase on the anode (at low potentials vs. Li/Li$^+$) for preventing irreversible consumption of electrolyte and lithium ions. An analogous layer known as the cathode electrolyte interphase layer forms at the cathode at high potentials vs. Li/Li$^+$. However, several days, or even up to a week or more, of these processes result in either lower lithium-ion battery (LIB) production rates or a prohibitively large size of charging-discharging equipment and space (i.e. excessive capital cost).

The protocol of the invention can be described generally to comprise the following steps:

Step 1 (First Partial Charge)—charge cell from open-circuit voltage (OCV) up to 80-90% of an upper cutoff voltage (UCV) of from 4-5 V at a C rate not less than 0.5C and not more than 1.5C.

Step 2 (First Shallow Charge)—charge cell from 80-90% of UCV to 97-100% of UCV at a C rate of not less than 0.2C and not more than 0.5C.

Step 3 (First Shallow Discharge)—discharge cell from 97-100% of UCV to 80-90% of UCV at a C rate of not less than 0.2C and not more than 0.5C.

Step 4 (Subsequent Charge/Discharge Cycles)—repeat steps 2-3 up to 2-10 times where the charging and discharging rates are progressively increased by 25-75%.

The invention is suitable for a number of lithium battery cathode chemistries combined with graphite. These include $LiNi_xMn_yCo_{1-x-y}O_2$ (NMC)/Graphite, where x≤1.0 and y≤1.0, $LiNi_xMn_yCo_{1-x-y}O_2$ (NMC)/Graphite, where x≤0.5 and y≤0.4, $LiNi_xMn_yCo_{1-x-y}O_2$ (NMC)/Graphite, where 0.5<x≤0.8 and 0.1≤y<0.4, $LiFePO_4$, $LiNi_xCo_yAl_{1-x-y}O_2$ where 0.5<x≤0.85 and 0.1≤y<0.25, $LiCoO_2$, $Li_{1+x}Ni_yMn_zCo_{1-x-y-z}O_2$, where 0.01≤x≤0.2, 0.1≤y<0.3 and 0.4<z≤0.65, and $LiNi_xFe_yAl_{1-x-y}O_2$ where 0.5<x≤0.8 and 0.1≤y<0.4. Other battery chemistries are possible, especially at the anode where the graphite may be mixed with up to 80 wt % Si.

The performance of cells should preferably meet acceptable standards. These include no less than 95% rated capacity retention after 100 0.33C/−0.33C cycles, and no less than 80% rated capacity retention after 1000 0.33C/−0.33C cycles.

The invention reduces the cycling time substantially. Cycling times in a range of 150-250 hours can be reduced to 10-50 hours. Cycling times for the invention can be 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50 hours, or within a range of any high value and low value selected from these values.

The above general protocol can be further refined for specific battery chemistry. Additional steps can also be added. There are presented below some examples for different battery chemistries.

$LiNi_xMn_yCo_{1-x-y}O_2$ (NMC)/Graphite, $x \leq 0.5$, $y \leq 0.4$.

Step 1 (First Partial Charge)—charge cell from open-circuit voltage (OCV) of ~3 V up to 3.7-3.9 V at a C rate not less than 0.5C (80 mA/g-NMC) and not more than 1.5C (240 mA/g-NMC).

Step 2 (First Shallow Charge)—charge cell from 3.7-3.9 V to maximum cell voltage of 4.2-4.3 V at a C rate of not less than 0.2C (32 mA/g-NMC) and not more than 0.5C (80 mA/g-NMC).

Step 3 (First Shallow Discharge)—discharge cell from 4.2-4.3 V to 3.7-3.9 V at a C rate of not less than 0.2C (32 mA/g-NMC) and not more than 0.5C (80 mA/g-NMC).

Step 4 (Second Shallow Charge)—charge cell from 3.7-3.9 V to maximum cell voltage of 4.2-4.3 V at a C rate of not less than 0.5C (80 mA/g-NMC) and not more than 0.75C (120 mA/g-NMC).

Step 5 (Second Shallow Discharge—discharge cell from 4.2-4.3 V to 3.7-3.9 V at a C rate of not less than 0.5C (80 mA/g-NMC) and not more than 0.75C (120 mA/g-NMC).

Step 6 (Third Shallow Charge)—charge cell from 3.7-3.9 V to maximum cell voltage of 4.2-4.3 V at a C rate of not less than 0.75C (120 mA/g-NMC) and not more than 1.2C (192 mA/g-NMC).

Step 7 (Third Shallow Discharge)—discharge cell from 4.2-4.3 V to 3.7-3.9 V at a C rate of not less than 0.75C (120 mA/g-NMC) and not more than 1.2C (192 mA/g-NMC).

Step 8 (Fourth Shallow Charge)—charge cell from 3.7-3.9 V to maximum cell voltage of 4.2-4.3 V at a C rate of not less than 1.2C (192 mA/g-NMC) and not more than 1.5C (240 mA/g-NMC).

Step 9 (Fourth Shallow Discharge)—discharge cell from 4.2-4.3 V to 3.7-3.9 V at a C rate of not less than 1.2C (192 mA/g-NMC) and not more than 1.5C (240 mA/g-NMC).

Step 10 (Fifth Shallow Charge)—charge cell from 3.7-3.9 V to maximum cell voltage of 4.2-4.3 V at a C rate of not less than 1.5C (240 mA/g-NMC) and not more than 2.0C (320 mA/g-NMC).

Step 11 (Fifth Full Discharge)—discharge cell from 4.2-4.3 V to 2.5 V at a C rate not less than 0.5C (80 mA/g-NMC) and not more than 1.5C (240 mA/g-NMC).

$LiNi_xMn_yCo_{1-x-y}O_2$ (NMC)/Graphite, $0.5 < x \leq 0.8$, $0.1 \leq y < 0.4$.

Step 1 (First Partial Charge)—charge cell from open-circuit voltage (OCV) of ~3 V up to 3.7-3.9 V at a C rate not less than 0.5C (95 mA/g-NMC) and not more than 1.5C (285 mA/g-NMC).

Step 2 (First Shallow Charge)—charge cell from 3.7-3.9 V to maximum cell voltage of 4.2-4.4 V at a C rate of not less than 0.2C (38 mA/g-NMC) and not more than 0.5C (95 mA/g-NMC).

Step 3 (First Shallow Discharge)—discharge cell from 4.2-4.4 V to 3.7-3.9 V at a C rate of not less than 0.2C (38 mA/g-NMC) and not more than 0.5C (95 mA/g-NMC).

Step 4 (Second Shallow Charge)—charge cell from 3.7-3.9 V to maximum cell voltage of 4.2-4.4 V at a C rate of not less than 0.5C (95 mA/g-NMC) and not more than 0.75C (142.5 mA/g-NMC).

Step 5 (Second Shallow Discharge)—discharge cell from 4.2-4.4 V to 3.7-3.9 V at a C rate of not less than 0.5C (95 mA/g-NMC) and not more than 0.75C (142.5 mA/g-NMC).

Step 6 (Third Shallow Charge)—charge cell from 3.7-3.9 V to maximum cell voltage of 4.2-4.4 V at a C rate of not less than 0.75C (142.5 mA/g-NMC) and not more than 1.2C (228 mA/g-NMC).

Step 7 (Third Shallow Discharge)—discharge cell from 4.2-4.4 V to 3.7-3.9 V at a C rate of not less than 0.75C (142.5 mA/g-NMC) and not more than 1.2C (228 mA/g-NMC).

Step 8 (Fourth Shallow Charge)—charge cell from 3.7-3.9 V to maximum cell voltage of 4.2-4.4 V at a C rate of not less than 1.2C (228 mA/g-NMC) and not more than 1.5C (285 mA/g-NMC).

Step 9 (Fourth Shallow Discharge)—discharge cell from 4.2-4.4 V to 3.7-3.9 V at a C rate of not less than 1.2C (228 mA/g-NMC) and not more than 1.5C (285 mA/g-NMC).

Step 10 (Fifth Shallow Charge)—charge cell from 3.7-3.9 V to maximum cell voltage of 4.2-4.4 V at a C rate of not less than 1.5C (285 mA/g-NMC) and not more than 2.0C (380 mA/g-NMC).

Step 11 (Fifth Full Discharge)—discharge cell from 4.2-4.4 V to 2.5 V at a C rate not less than 0.5C (95 mA/g-NMC) and not more than 1.5C (285 mA/g-NMC).

$LiFePO_4$ (LFP)/Graphite

Step 1 (First Partial Charge)—charge cell from open-circuit voltage (OCV) of ~2.5 V up to 3.2-3.4 V at a C rate not less than 0.5C (75 mA/g-LFP) and not more than 1.5C (225 mA/g-LFP).

Step 2 (First Shallow Charge)—charge cell from 3.2-3.4 V to maximum cell voltage of 3.6-3.7 V at a C rate of not less than 0.2C (30 mA/g-LFP) and not more than 0.5C (75 mA/g-LFP).

Step 3 (First Shallow Discharge)—discharge cell from 3.6-3.7 V to 3.2-3.4 V at a C rate of not less than 0.2C (30 mA/g-LFP) and not more than 0.5C (75 mA/g-LFP).

Step 4 (Second Shallow Charge)—charge cell from 3.2-3.4 V to maximum cell voltage of 3.6-3.7 V at a C rate of not less than 0.5C (75 mA/g-LFP) and not more than 0.75C (112.5 mA/g-LFP).

Step 5 (Second Shallow Discharge)—discharge cell from 3.6-3.7 V to 3.2-3.4 V at a C rate of not less than 0.5C (75 mA/g-LFP) and not more than 0.75C (112.5 mA/g-LFP).

Step 6 (Third Shallow Charge)—charge cell from 3.2-3.4 V to maximum cell voltage of 3.6-3.7 V at a C rate of not less than 0.75C (112.5 mA/g-LFP) and not more than 1.2C (180 mA/g-LFP).

Step 7 (Third Shallow Discharge)—discharge cell from 3.6-3.7 V to 3.2-3.4 V at a C rate of not less than 0.75C (112.5 mA/g-LFP) and not more than 1.2C (180 mA/g-LFP).

Step 8 (Fourth Shallow Charge)—charge cell from 3.2-3.4 V to maximum cell voltage of 3.6-3.7 V at a C rate of not less than 1.2C (180 mA/g-LFP) and not more than 1.5C (225 mA/g-LFP).

Step 9 (Fourth Shallow Discharge)—discharge cell from 3.6-3.7 V to 3.2-3.4 V at a C rate of not less than 1.2C (180 mA/g-LFP) and not more than 1.5C (225 mA/g-LFP).

Step 10 (Fifth Shallow Charge)—charge cell from 3.2-3.4 V to maximum cell voltage of 3.6-3.7 V at a C rate of not less than 1.5C (225 mA/g-LFP) and not more than 2.0C (300 mA/g-LFP).

Step 11 (Fifth Full Discharge)—discharge cell from 3.6-3.7 V to 2.5 V at a C rate not less than 0.5C (75 mA/g-LFP) and not more than 1.5C (225 mA/g-LFP).

$LiNi_xCo_yAl_{1-x-y}O_2$ (NCA)/Graphite, $0.5 < x \le 0.85$, $0.1 \le y < 0.25$ Step 1 (First Partial Charge)—charge cell from open-circuit voltage (OCV) of ~3 V up to 3.7-3.9 V at a C rate not less than 0.5C (100 mA/g-NCA) and not more than 1.5C (300 mA/g-NCA).

Step 2 (First Shallow Charge)—charge cell from 3.7-3.9 V to maximum cell voltage of 4.2-4.3 V at a C rate of not less than 0.2C (40 mA/g-NCA) and not more than 0.5C (100 mA/g-NCA).

Step 3 (First Shallow Discharge)—discharge cell from 4.2-4.3 V to 3.7-3.9 V at a C rate of not less than 0.2C (40 mA/g-NCA) and not more than 0.5C (100 mA/g-NCA).

Step 4 (Second Shallow Charge)—charge cell from 3.7-3.9 V to maximum cell voltage of 4.2-4.3 V at a C rate of not less than 0.5C (100 mA/g-NCA) and not more than 0.75C (150 mA/g-NCA).

Step 5 (Second Shallow Discharge)—discharge cell from 4.2-4.3 V to 3.7-3.9 V at a C rate of not less than 0.5C (100 mA/g-NCA) and not more than 0.75C (150 mA/g-NCA).

Step 6 (Third Shallow Charge)—charge cell from 3.7-3.9 V to maximum cell voltage of 4.2-4.3 V at a C rate of not less than 0.75C (150 mA/g-NCA) and not more than 1.2C (240 mA/g-NCA).

Step 7 (Third Shallow Discharge)—discharge cell from 4.2-4.3 V to 3.7-3.9 V at a C rate of not less than 0.75C (150 mA/g-NCA) and not more than 1.2C (240 mA/g-NCA).

Step 8 (Fourth Shallow Charge)—charge cell from 3.7-3.9 V to maximum cell voltage of 4.2-4.3 V at a C rate of not less than 1.2C (240 mA/g-NCA) and not more than 1.5C (300 mA/g-NCA).

Step 9 (Fourth Shallow Discharge)—discharge cell from 4.2-4.3 V to 3.7-3.9 V at a C rate of not less than 1.2C (240 mA/g-NCA) and not more than 1.5C (300 mA/g-NCA).

Step 10 (Fifth Shallow Charge)—charge cell from 3.7-3.9 V to maximum cell voltage of 4.2-4.3 V at a C rate of not less than 1.5C (300 mA/g-NCA) and not more than 2.0C (400 mA/g-NCA).

Step 11 (Fifth Full Discharge)—discharge cell from 4.2-4.3 V to 2.5 V at a C rate not less than 0.5C (100 mA/g-NCA) and not more than 1.5C (300 mA/g-NCA).

$LiCoO_2$ (LCO)/Graphite

Step 1 (First Partial Charge)—charge cell from open-circuit voltage (OCV) of ~3 V up to 3.7-3.9 V at a C rate not less than 0.5C (70 mA/g-LCO) and not more than 1.5C (210 mA/g-LCO).

Step 2 (First Shallow Charge)—charge cell from 3.7-3.9 V to maximum cell voltage of 4.2-4.3 V at a C rate of not less than 0.2C (28 mA/g-LCO) and not more than 0.5C (70 mA/g-LCO).

Step 3 (First Shallow Discharge)—discharge cell from 4.2-4.3 V to 3.7-3.9 V at a C rate of not less than 0.2C (28 mA/g-LCO) and not more than 0.5C (70 mA/g-LCO).

Step 4 (Second Shallow Charge)—charge cell from 3.7-3.9 V to maximum cell voltage of 4.2-4.3 V at a C rate of not less than 0.5C (70 mA/g-LCO) and not more than 0.75C (105 mA/g-LCO).

Step 5 (Second Shallow Discharge)—discharge cell from 4.2-4.3 V to 3.7-3.9 V at a C rate of not less than 0.5C (70 mA/g-LCO) and not more than 0.75C (105 mA/g-LCO).

Step 6 (Third Shallow Charge)—charge cell from 3.7-3.9 V to maximum cell voltage of 4.2-4.3 V at a C rate of not less than 0.75C (105 mA/g-LCO) and not more than 1.2C (168 mA/g-LCO).

Step 7 (Third Shallow Discharge)—discharge cell from 4.2-4.3 V to 3.7-3.9 V at a C rate of not less than 0.75C (105 mA/g-LCO) and not more than 1.2C (168 mA/g-LCO).

Step 8 (Fourth Shallow Charge)—charge cell from 3.7-3.9 V to maximum cell voltage of 4.2-4.3 V at a C rate of not less than 1.2C (168 mA/g-LCO) and not more than 1.5C (210 mA/g-LCO).

Step 9 (Fourth Shallow Discharge)—discharge cell from 4.2-4.3 V to 3.7-3.9 V at a C rate of not less than 1.2C (168 mA/g-LCO) and not more than 1.5C (210 mA/g-LCO).

Step 10 (Fifth Shallow Charge)—charge cell from 3.7-3.9 V to maximum cell voltage of 4.2-4.3 V at a C rate of not less than 1.5C (210 mA/g-LCO) and not more than 2.0C (280 mA/g-LCO).

Step 11 (Fifth Full Discharge)—discharge cell from 4.2-4.3 V to 2.5 V at a C rate not less than 0.5C (70 mA/g-LCO) and not more than 1.5C (210 mA/g-LCO).

$Li_{1+x}Ni_yMn_zCo_{1-x-y-z}O_2$ (NMC)/Graphite, $0.01 \le x \le 0.2$, $0.1 \le y < 0.3$, $0.4 < z \le 0.65$.

Step 1 (First Partial Charge)—charge cell from open-circuit voltage (OCV) of ~3 V up to 3.9-4.1 V at a C rate not less than 0.5C (115 mA/g-NMC) and not more than 1.5C (345 mA/g-NMC).

Step 2 (First Shallow Charge)—charge cell from 3.9-4.1 V to maximum cell voltage of 4.3-4.5 V at a C rate of not less than 0.2C (46 mA/g-NMC) and not more than 0.5C (115 mA/g-NMC).

Step 3 (First Shallow Discharge)—discharge cell from 4.3-4.5 V to 3.9-4.1 V at a C rate of not less than 0.2C (46 mA/g-NMC) and not more than 0.5C (115 mA/g-NMC).

Step 4 (Second Shallow Charge)—charge cell from 3.9-4.1 V to maximum cell voltage of 4.3-4.5 V at a C rate of not less than 0.5C (115 mA/g-NMC) and not more than 0.75C (172.5 mA/g-NMC).

Step 5 (Second Shallow Discharge—discharge cell from 4.3-4.5 V to 3.9-4.1 V at a C rate of not less than 0.5C (115 mA/g-NMC) and not more than 0.75C (172.5 mA/g-NMC).

Step 6 (Third Shallow Charge)—charge cell from 3.9-4.1 V to maximum cell voltage of 4.3-4.5 V at a C rate of not less than 0.75C (172.5 mA/g-NMC) and not more than 1.2C (276 mA/g-NMC).

Step 7 (Third Shallow Discharge)—discharge cell from 4.3-4.5 V to 3.9-4.1 V at a C rate of not less than 0.75C (172.5 mA/g-NMC) and not more than 1.2C (276 mA/g-NMC).

Step 8 (Fourth Shallow Charge)—charge cell from 3.9-4.1 V to maximum cell voltage of 4.3-4.5 V at a C rate of not less than 1.2C (276 mA/g-NMC) and not more than 1.5C (345 mA/g-NMC).

Step 9 (Fourth Shallow Discharge)—discharge cell from 4.3-4.5 V to 3.9-4.1 V at a C rate of not less than 1.2C (276 mA/g-NMC) and not more than 1.5C (345 mA/g-NMC).

Step 10 (Fifth Shallow Charge)—charge cell from 3.9-4.1 V to maximum cell voltage of 4.3-4.5 V at a C rate of not less than 1.5C (345 mA/g-NMC) and not more than 2.0C (460 mA/g-NMC).

Step 11 (Fifth Full Discharge)—discharge cell from 4.3-4.5 V to 2.5 V at a C rate not less than 0.5C (115 mA/g-NMC) and not more than 1.5C (345 mA/g-NMC).

$LiNi_xFe_yAl_{1-x-y}O_2$ (NFA)/Graphite, $0.5 < x \le 0.8$, $0.1 \le y < 0.4$.

Step 1 (First Partial Charge)—charge cell from open-circuit voltage (OCV) of ~3 V up to 3.7-3.9 V at a C rate not less than 0.5C (100 mA/g-NFA) and not more than 1.5C (300 mA/g-NFA).

Step 2 (First Shallow Charge)—charge cell from 3.7-3.9 V to maximum cell voltage of 4.2-4.3 V at a C rate of not less than 0.2C (40 mA/g-NFA) and not more than 0.5C (100 mA/g-NFA).

Step 3 (First Shallow Discharge)—discharge cell from 4.2-4.3 V to 3.7-3.9 V at a C rate of not less than 0.2C (40 mA/g-NFA) and not more than 0.5C (100 mA/g-NFA).

Step 4 (Second Shallow Charge)—charge cell from 3.7-3.9 V to maximum cell voltage of 4.2-4.3 V at a C rate of not less than 0.5C (100 mA/g-NFA) and not more than 0.75C (150 mA/g-NFA).

Step 5 (Second Shallow Discharge)—discharge cell from 4.2-4.3 V to 3.7-3.9 V at a C rate of not less than 0.5C (100 mA/g-NFA) and not more than 0.75C (150 mA/g-NFA).

Step 6 (Third Shallow Charge)—charge cell from 3.7-3.9 V to maximum cell voltage of 4.2-4.3 V at a C rate of not less than 0.75C (150 mA/g-NFA) and not more than 1.2C (240 mA/g-NFA).

Step 7 (Third Shallow Discharge)—discharge cell from 4.2-4.3 V to 3.7-3.9 V at a C rate of not less than 0.75C (150 mA/g-NFA) and not more than 1.2C (240 mA/g-NFA).

Step 8 (Fourth Shallow Charge)—charge cell from 3.7-3.9 V to maximum cell voltage of 4.2-4.3 V at a C rate of not less than 1.2C (240 mA/g-NFA) and not more than 1.5C (300 mA/g-NFA).

Step 9 (Fourth Shallow Discharge)—discharge cell from 4.2-4.3 V to 3.7-3.9 V at a C rate of not less than 1.2C (240 mA/g-NFA) and not more than 1.5C (300 mA/g-NFA).

Step 10 (Fifth Shallow Charge)—charge cell from 3.7-3.9 V to maximum cell voltage of 4.2-4.3 V at a C rate of not less than 1.5C (300 mA/g-NFA) and not more than 2.0C (400 mA/g-NFA).

Step 11 (Fifth Full Discharge)—discharge cell from 4.2-4.3 V to 2.5 V at a C rate not less than 0.5C (100 mA/g-NFA) and not more than 1.5C (300 mA/g-NFA).

Testing was performed where graphite, NMC 532, and 1.2 M $LiPF_6$ in ethylene carbonate:diethyl carbonate were used as anodes, cathodes, and electrolytes, respectively. Results from electrochemical impedance spectroscopy show the new protocol reduced surface film (electrolyte interphase) resistances, and 1300 aging cycles show an improvement in capacity retention.

Different C-rates were evaluated with high-voltage cells (graphite as anodes and layered oxides, NMC 532, as cathodes) and compared with the protocols of the invention, which not only reduced formation time, but also increased cell capacity retention. A simple wetting process was applied in this study. C-rate tests, aging tests, and performance checks during aging were conducted for six different formation protocols, three baseline protocols and three alternative protocols according to the invention. Electrochemical impedance spectroscopy (EIS) was also measured to investigate total resistance and resistance components.

Most SEI and CEI form at a high SOC because electrolytes undergo more reduction reactions at anode and more oxidation reactions at cathode. An anode SEI layer at high SOC is more compact and stable than that at low SOC because the potentials at high SOC result in more electrolyte instability and more lithium is available at the anode for reduction with bulk compounds. The SOC should remain high for a longer period of time and low for a shorter period of time in order to have a compact and stable electrolyte interphase layer, but the SOC should not simply be held at a higher cut-off voltage that results in the current (electron-flow) dropping down to nearly zero.

Figure 1B:
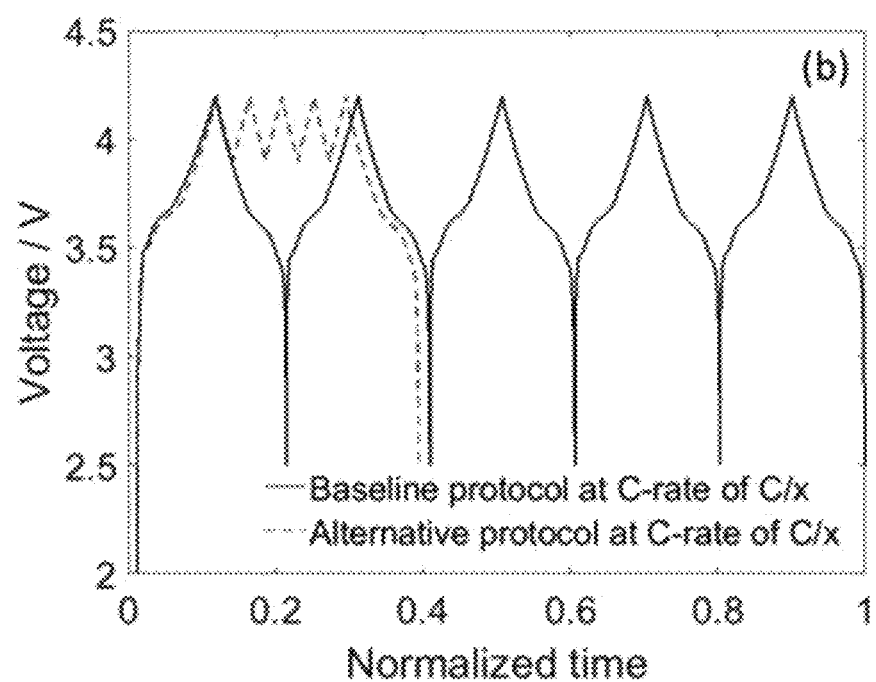

Typical potential profiles (cathode denoted as $\mu_C$, anode denoted as $\mu_A$, and potential difference between anode and cathode denoted as $V_{OC}$) from a three-electrode pouch cell (graphite/Li/$Li_{1.02}Ni_{0.50}Mn_{0.29}Co_{0.19}O$) are illustrated in FIG. 1A showing the unstable potential ranges of the cathode and anode. The intensity indicates the relative degree of instability of the electrolyte. According to the invention a protocol for electrolyte interphase formation shown in FIG. 1B is compared with a baseline protocol, the latter of which consists of a series of charge and discharge cycles at a constant C-rate without any interruption between the lower and upper cut-off voltages. The protocol of the invention, however, involves repeated cycling within a high SOC region (after the first charge) until the last cycle where a full discharge takes place.

FIG. 1A and FIG. 1B present a typical cathode potential ($\mu_C$), anode potential ($\mu_A$), and voltage between anode and cathode ($V_{OC}$) from a three-electrode pouch cell (graphite anode/Li reference/$Li_{1.02}Ni_{0.50}Mn_{0.29}Co_{0.19}O_2$ cathode) with potential ranges where the electrolyte is not stable. FIG. 1A is cell voltage profiles from a baseline and FIG. 1B is SEI formation protocol according to the invention.

The baseline formation protocol was evaluated with three different equal charge and discharge C-rates: C/20, C/10, and C/5. Rates of C/20 or C/10 are generally used for at least the first formation cycle in standard cell manufacturing. The baseline formation protocols were compared with the invention protocols using the same three equal charging and discharging C-rates: C/20, C/10, and C/5. Abbreviations are listed with their respective descriptions in Table 1. Prior to beginning all formation cycling, each cell was exposed to a 3-h electrolyte wetting process. Eighteen ~1.5 Ah pouch cells were assembled for testing using the six different formation protocols (three pouch cells were used or each protocol). The cell chemistry and dimensions are listed in Table 2.

TABLE 1

Abbreviations used and associated formation conditions

| | | SEI formation condition | | | |
|---|---|---|---|---|---|
| | Test group abbreviation | C-rate | Higher cut-off voltage | Intermediate voltage turning to charge mode | Lower cut-off voltage | Number of charge/discharge cycles |
| Baseline formation | F@C/20<br>F@C/10<br>F@C/5 | C/20<br>C/10<br>C/5 | 4.2 v | None | 2.5 V | 5 |

TABLE 1-continued

Abbreviations used and associated formation conditions

| | | | SEI formation condition | | | |
|---|---|---|---|---|---|---|
| | Test group abbreviation | C-rate | Higher cut-off voltage | Intermediate voltage turning to charge mode | Lower cut-off voltage | Number of charge/ discharge cycles |
| Alternative formation | F@C/20a F@C/10a F@C/5a | C/20 C/10 C/5 | | 4.0 V 3.9 V | | |
| | Test group abbreviation | | | SEI formation condition | | |

TABLE 2

Cell information

| | Composition | Size (loading) (porosity) |
|---|---|---|
| Anode | Electrode: 92 wt % A12 graphite (ConocoPhillips), 2 wt % C-65 carbon black (Timcal), 6 wt % polyvinylidene fluoride (PVDF, Kureha 9300) Current collector: Copper foil Tab: nickel | Electrode only 84.4 mm × 56 mm × 65 μm (6.36 mg/cm$^2$) [55%] |
| Cathode | Electrode: 90 wt % $Li_{1.02}Ni_{0.50}Mn_{0.29}Co_{0.19}O_2$ (NMC 532 or MCM 532, TODA America Inc.). 5 wt % power grade carbon black (Denka), 5 wt % PVDF (Solvay Solef 5130) Current collector: Aluminum foil Tab: Aluminum | Electrode only 84.4 mm × 56 mm × 64 μm (12.02 mg/cm$^2$) [55%] |
| Separator | Polypropylene—polyethylene—polypropylene (Celgard 2325) | 89 mm × 61 mm × 25 μm [39%] |
| Electrolyte | 1.2M $LiPF_6$ in EC:DEC (3:7 by weight, BASF) | — |

Electrodes were coated and dried using a slot-die coater (Frontier Industrial Technology) in the DOE Battery Manufacturing R&D Facility at ORNL, but they were not calendered. Cell assembly was completed in a dry room where the relative humidity was held between 0.1 and 0.2% at a room temperature of 21° C. Secondary drying of the electrodes was completed overnight at 80 C under vacuum prior to assembly to minimize moisture content. The electrolyte volume ratio used in each cell was 2.5 (ratio of electrolyte volume to total cell pore volume) to minimize the effect of insufficient electrolyte, and the cells were sealed under vacuum at 700 mm Hg.

After assembly, all cells were rested for 2 h at 21° C. for the first electrolyte wetting, then placed in an environmental chamber (ESPEC Corp.) at 30° C., and connected to a battery tester (Series 4600, Maccor Inc.). Next the cells were charged at C/3 until the tap voltage reached 1.5 V to avoid corrosion of the copper current collector and rested again for 1 h for the second electrolyte wetting. The pouch cells went through their respective series of formation cycles using the protocols shown in Table 1 and FIG. 1B, and were subsequently evaluated at C/5, C/2, 1C, and 3C for initial rate performance. Capacity fade was measured over 1300 cycles at 1C charge/discharge rates where 1C was based on 160 mAh/g (normalized by the NMC 532 wt). Upper and lower cut-off voltages were 4.4 V and 2.5 V, respectively, for all charge discharge cycles.

EIS was measured before the aging cycles, after 300 cycles, and after 1300 cycles to analyze resistance increases using VSP potentiostat systems (EC-Lab, Bio-Logic Science Instruments SAS). These measurements were performed at 25% discharge intervals and frequencies from 400 kHz to 10 mHz with 5 mV oscillation amplitudes. Nyquist plots were fitted using EC-Lab software (Bio-Logic Science Instruments SAS) to analyze ohmic resistance ($R_{ohmic}$), surface film resistance ($R_{sf}$), and charge transfer resistance ($R_{ct}$). All other data processing and calculations were performed using Matlab R2016 (MathWorks, Inc).

Figure 2A:
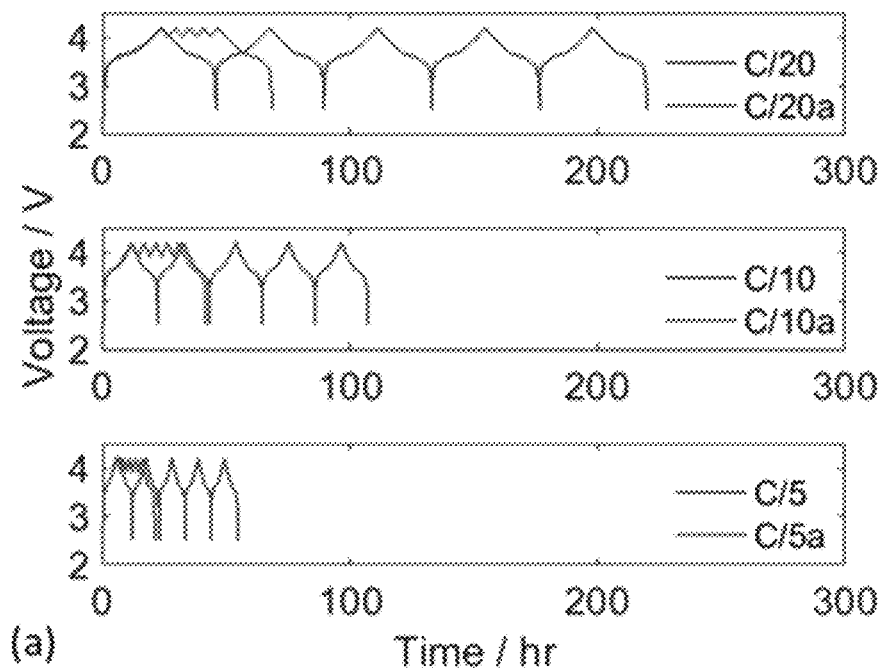
FIG. 2A is voltage profiles for three baseline formation protocols (extended times in dark gray) and three alternative protocols (C-rates denoted with "a" and shortened times in light gray).
Figure 2B:
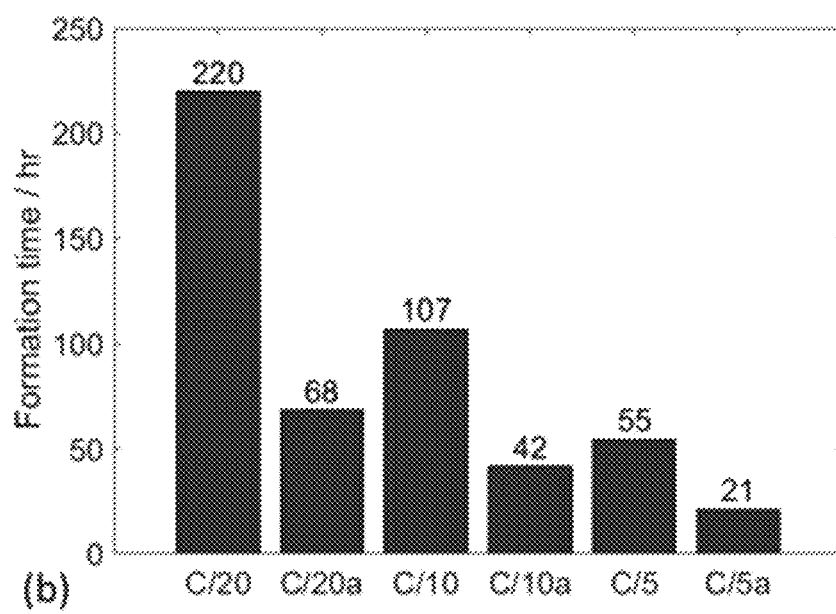
FIG. 2B is corresponding formation times.

Most formation processes utilize three cycles or more at C/5, C/10 or even C/20 charge and discharge rates. Five formation cycles were conducted to confirm capacity convergence. FIG. 2A shows experimental results of voltage profiles vs. time for the baseline and invention protocols at different C-rates. Five formation cycles with the baseline C/20, C/10, and C/5 charging and discharging rates resulted in 220, 107 and 55 h, respectively, while those with the invention C/20 (C/20a), C/10 (C/10a), and C/5 (C/5a) rates resulted in 68, 42, and 21 h as shown in FIG. 2B. Compared to the baseline protocol, the alternatives reduced formation time by 60% or more at each C-rate. When the invention C/5 (C/5a) protocol is compared to the baseline C/20 protocol, a 90% reduction in formation time is realized. For the case of three C/20 baseline cycles, the formation time with C/5a is still 6 times faster.

Figure 3A:
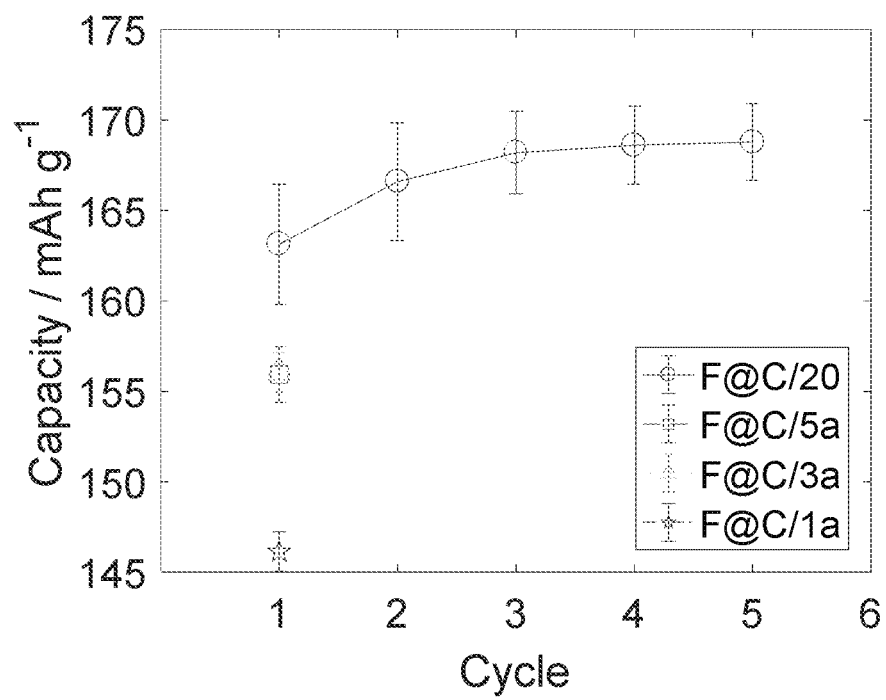
FIG. 3A is average discharge capacities with 90% confidence intervals using different formation protocols during formation cycling (several alternative protocols denoted with "a" compared to C/20 baseline).
Figure 3B:
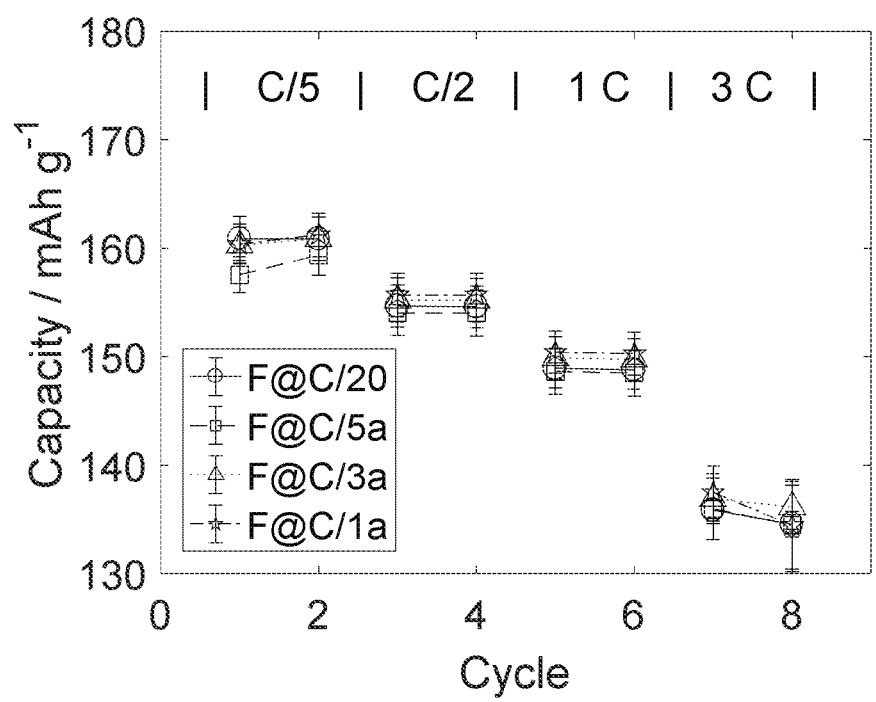
FIG. 3B is post-formation rate capability testing.
Figure 4A:
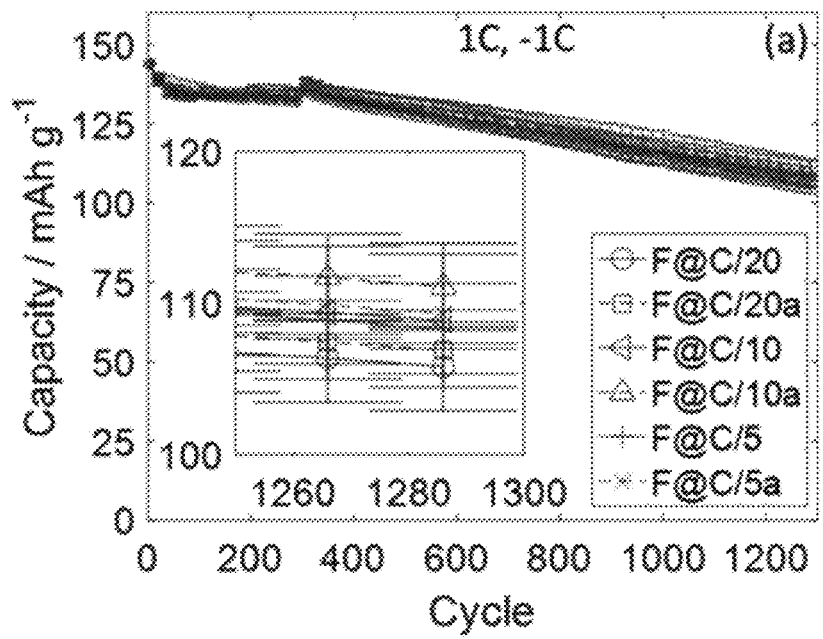
FIG. 4A and FIG. 4C are discharge capacity and FIG. 4B and FIG. 4D are discharge capacity retention during aging for each 1C and −1C cycle (FIG. 4A, FIG. 4B) and each C/5 and −C/5 loop (FIG. 4C and FIG. 4D) where each loop is 50 cycles.
Figure 4B:
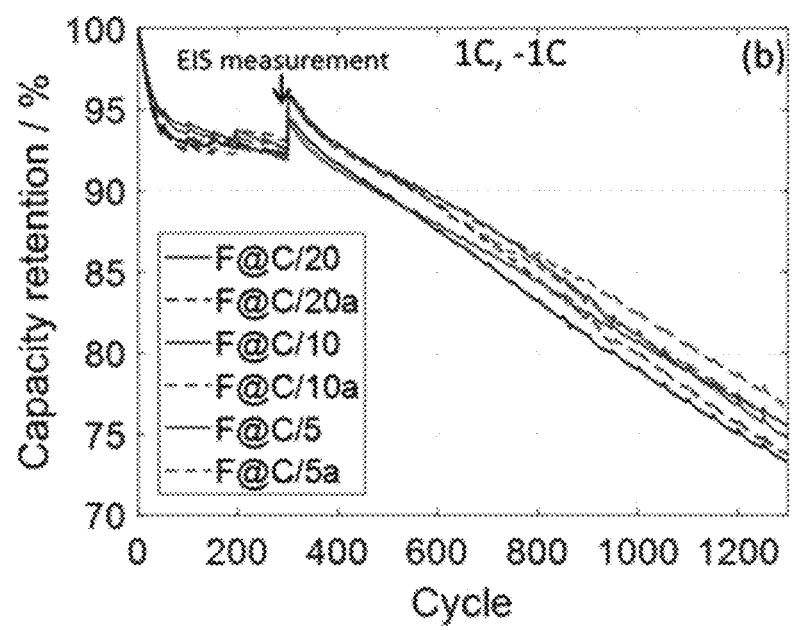
Figure 4C:
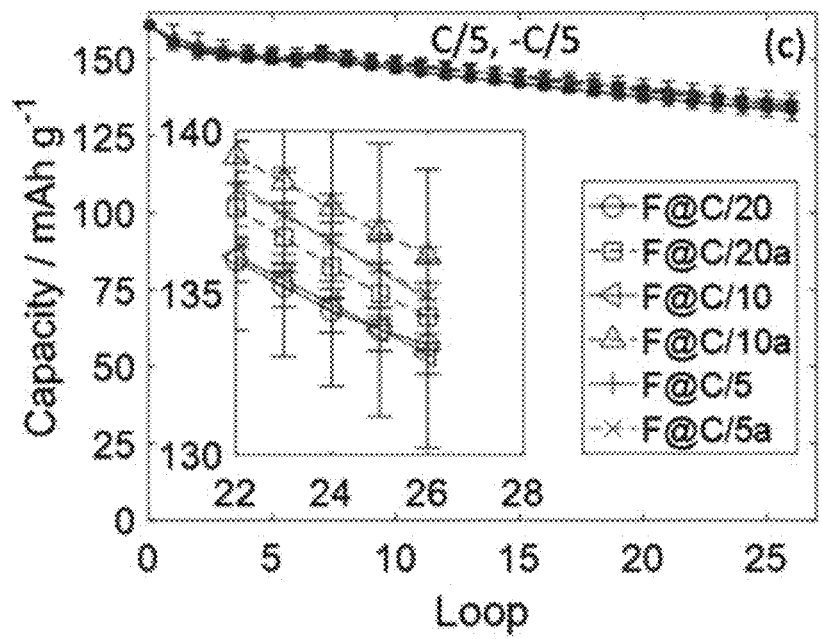
Figure 4D:
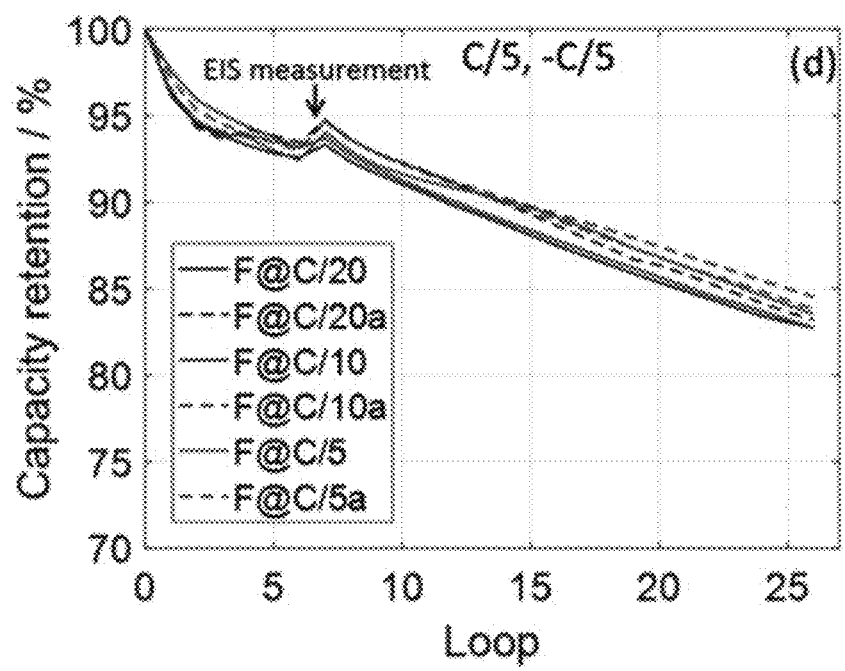

FIG. 3A is average discharge capacities with 90% confidence intervals using different formation protocols during formation cycling. FIG. 3B is post-formation rate capability testing. Capacities from alternative protocols in FIG. 3A show only one value at the first cycle for each formation C-rate because the alternative protocol contains only one full discharge.

During formation cycling, discharge capacities with the invention formation protocol exhibited 10-20 mAh g$^{-1}$ lower than those with the baseline protocol (FIG. 3A). The capacity data sets for the invention formation protocols are all located on cycle #1 because the protocols contain only one full discharge step. However, cells cycled with both the baseline and invention protocols had similar discharge capacities during rate capability testing as shown in FIG. 3B where error bars correspond to 90% confidence intervals.

Initial and final capacities of cells cycled with different formation protocols were also similar during aging (FIG. 4). FIG. 4A and FIG. 4C are discharge capacity and FIG. 4B and FIG. 4D are discharge capacity retention during aging for each 1C charge and 1C discharge cycle (FIG. 4A, FIG. 4B) and each C/5 and .C/5 loop (FIG. 4C and FIG. 4D) where each loop is 50 cycles. The three different C-rates (C/20, C/10, and C/5) for both baseline and invention protocols did not significantly affect capacities at C-rate and aging tests. A capacity increase occurred for each cell after EIS measurements at 300th cycle. Capacity retention shown in FIG. 4B after 1000 cycles at 1C charge and discharge rates was about 80% for cells using the baseline protocols and about 82% for cells using the alternative protocol ones. The cyclability at C/5 charge and discharge rates is also similar with 86% capacity retention after 1000 cycles (20th loop) as shown in FIG. 4C and FIG. 4D. Although these results are similar when considering the error bars of each data, the indication is that the invention formation protocol had a positive impact on the cell performance rather than any negative one.

Figure 5:
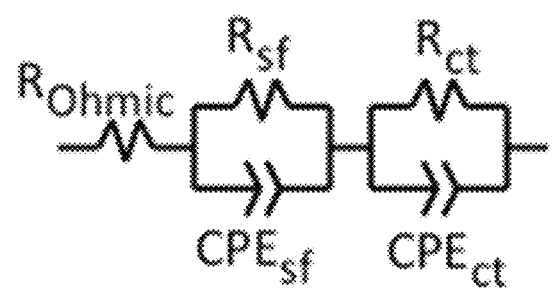
FIG. 5 is the equivalent circuit model used in this impedance analysis.
Figure 6A:
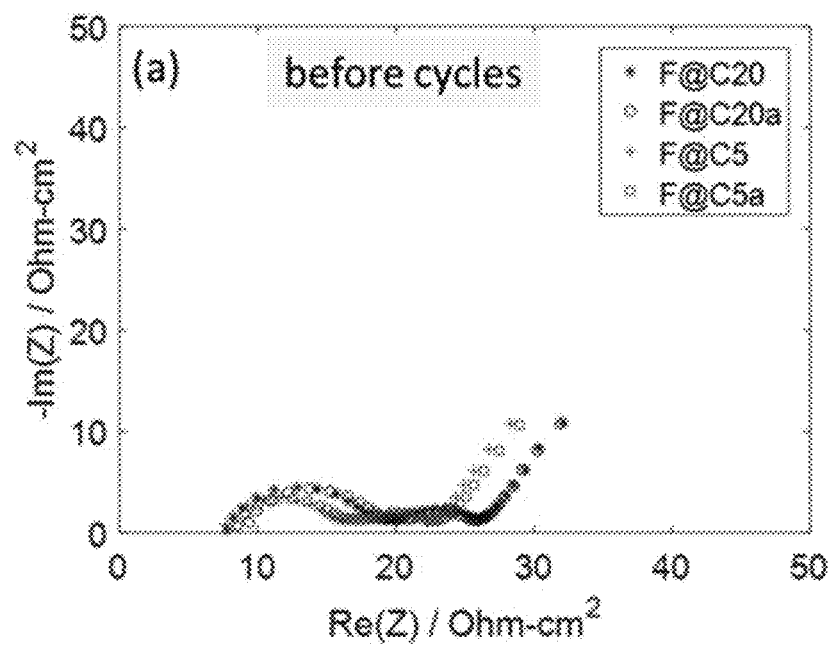
FIGS. 6A-6F are electrochemical impedance spectroscopy (EIS) Nyquist plots from cells with different formation protocols (FIG. 6A, FIG. 6C, and FIG. 6E) near 3.9 V±0.05 V during discharge; average areal specific resistances (ASR) of F@C/20 and F@C/5a (FIG. 6B, FIG. 6D, and FIG. 6F) at different voltages before aging cycles (FIG. 6B), after 300 cycles (FIG. 6D), and after 1300 cycles (FIG. 6F).
Figure 6B:
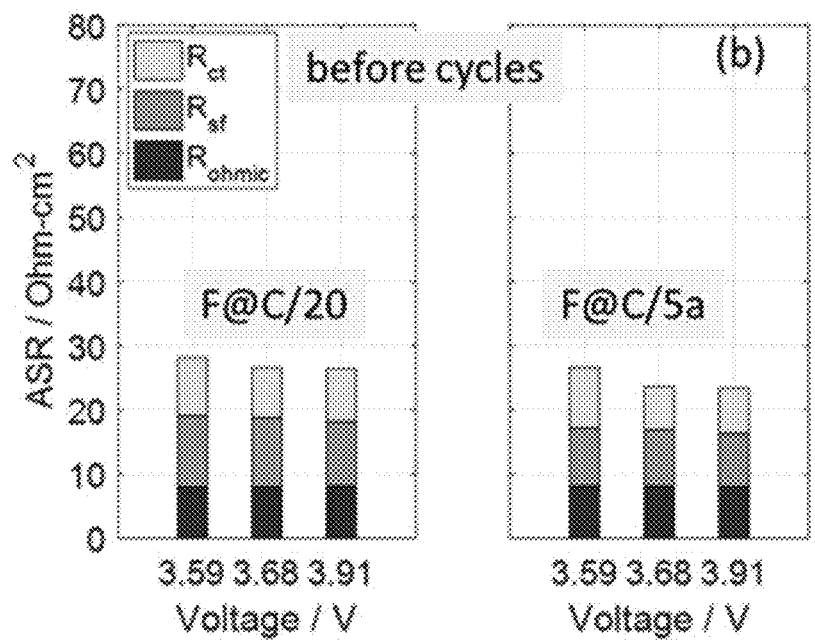
Figure 6C:
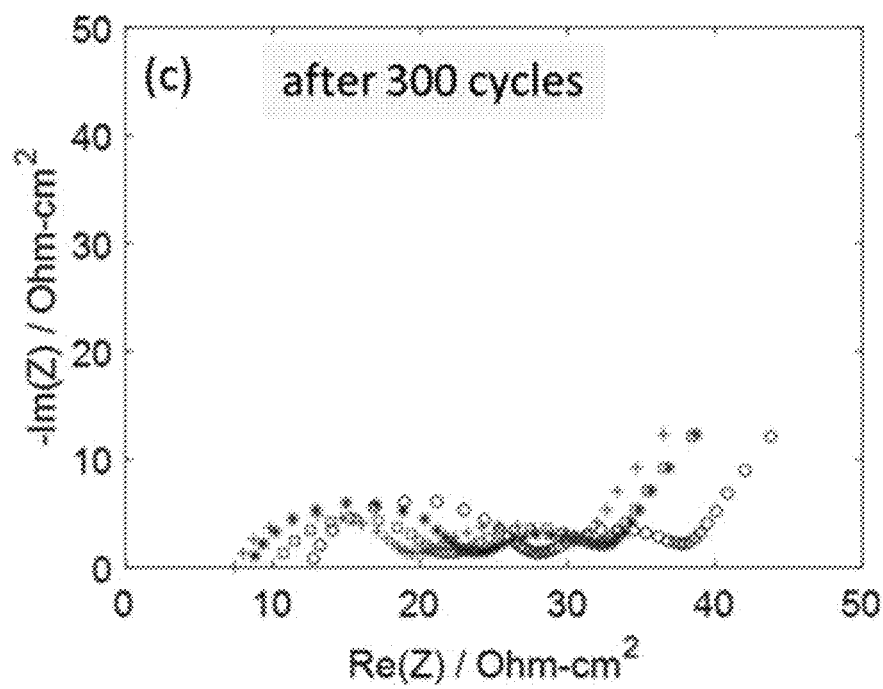
Figure 6D:
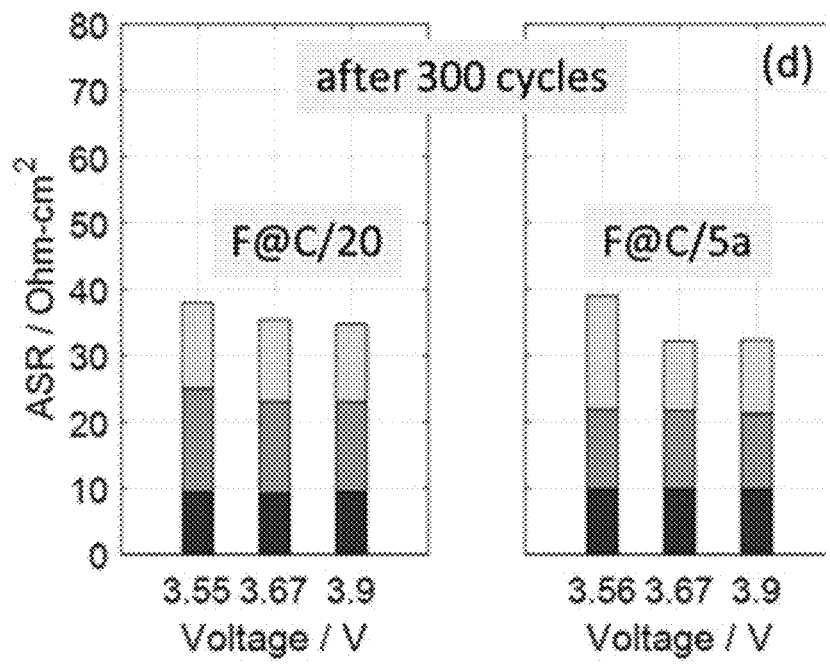
Figure 6E:
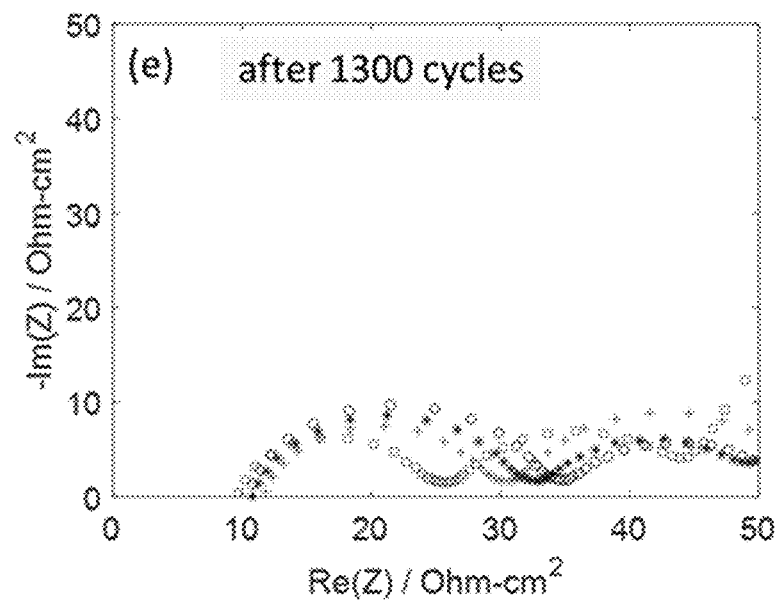
Figure 6F:
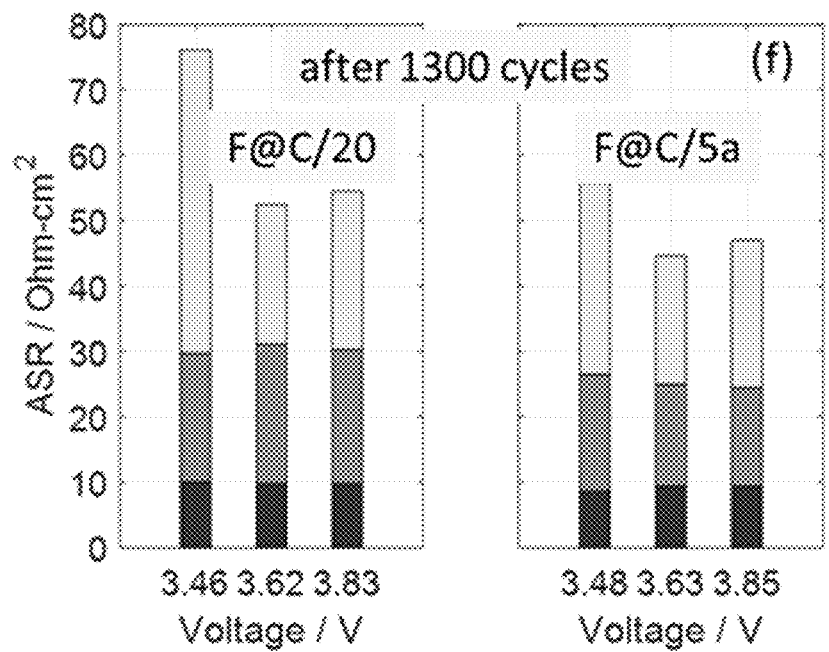

The equivalent circuit model used for the EIS fitting is shown in FIG. 5. $R_{ohmic}$, $R_{sf}$, and $R_{ct}$ represent the ohmic resistance, surface film (electrolyte interphase) resistance, and charge transfer resistance, respectively. On the left in FIG. 6, the EIS intercepts with the real axis in the high-frequency region are generally considered as $R_{ohmic}$, which involves resistances from lithium ion transport through the electrolyte and from electron transport through the electrodes, current collectors, cables, and lead clips between the cell and potentiostat. The first semicircles at the high-to-medium frequency region (ca. 80 k-200 Hz) are related to $R_{sf}$ and attributed to impedances from lithium ion migration through the surface films. The second semicircles at the medium-to-low frequency region (ca. 200-0.4 Hz) are related to $R_{ct}$ and are impedances from charge transfer between the liquid electrolyte and solid surface. The linear Warburg-type elements at the low frequency region (ca. 0.4-0.01 Hz) correspond to lithium-ion diffusion in the active material particles, which were not included in the data fitting in this study. In parallel to $R_{sf}$ and $R_{ct}$ in the equivalent circuit model, $CPE_{sf}$ and $CPE_{ct}$ represent the capacitance of the surface film and charge transfer, respectively. A constant phase element (CPE) was applied instead of an ideal capacitor element to account for imperfect capacitor behavior in a large, porous electrode.

Representative impedances near 3.9 V during discharge from F@C20, F@C/20a, F@C/5 and F@C/5a are shown in Nyquist plots on the left side of FIG. 6. FIG. 6 is EIS Nyquist plots from cells with different formation protocols (FIG. 6A, FIG. 6C, and FIG. 6E) near 3.9 V±0.05 V during discharge; average areal specific resistances (ASR) of F@C/20 and F@C/5a (FIG. 6B, FIG. 6D, and FIG. 6F) at different voltages before aging cycles (FIG. 6B), after 300 cycles (FIG. 6D), and after 1300 cycles (FIG. 6F).

On the right side of FIG. 6, average areal specific resistances from the EIS of two extreme cases (F@C/20 and F@C/5a) were compared at different voltages. Resistances from F@C/5a (fastest alternative formation protocol) before aging cycles were slightly lower than those from F@C/20 (slowest baseline formation protocol). As the cells were cycled, the resistances from F@C/5a were significantly smaller than those from F@C/20. All ohmic resistances increased slightly (by ca. 10%) after 1300 cycles while surface film resistances and charge transfer resistances significantly increased (by 80% or more). The increase in charge transfer resistance was larger than that of the surface film resistance for both F@C/20 and F@C/5a. However, F@C/5a showed 25-30% smaller surface film resistance than F@C/20 both before and after aging cycles, implying the cells with alternative formation cycles had more robust electrolyte interphase layers than those with the baseline formation cycles. Regarding baseline protocols, SEI analysis using X-ray photoelectron spectroscopy and separation of anode and cathode resistances using three-electrode cells were elaborated elsewhere.

The invention demonstrates the effectiveness of a formation protocol having more (shallow) charge-discharge cycles between 3.9 V and 4.2 V and fewer (full depth of discharge) cycles below 3.9 V. The invention formation protocol shortened formation time by 6 times or more without compromising cell performance; rather, it improved capacity retention, which will have a significant impact on the operating and capital cost of manufacturing LIBs. For both protocols, the different C-rates, at least up to C/5 during formation, did not significantly affect capacities and capacity fades. Analysis via EIS showed substantially lower surface film (electrolyte interphase) resistance for the cells that underwent the fastest alternative formation protocol than those that underwent the slowest baseline formation protocol, indicating that the alternative protocol provided a more robust and chemically stable electrolyte interphase layer.

Five different formation protocols were tested with nickel-rich $LiNi_{0.8}Mn_{0.1}Co_{0.1}O_2$ (NMC811)/graphite cells where the total formation time varied from 10 to 86 h. Electrochemical characterization and analysis show that very long formation times do not necessarily improve long-term performance while very short formation protocols result in lithium plating and poorer electrochemical performance. The formation cycling protocol of the invention is intermediate in length to minimize impedance growth, improve capacity retention, and avoid lithium plating.

Five different formation protocols for large format pouch cells, where the total formation time varied from 10 to 86 h. Materials and cell design are representative of lithium-ion batteries with relatively high energy density and low cost. For example, the cathode is nickel-rich $LiNi_{0.8}Mn_{0.1}Co_{0.1}O_2$ (NMC811), which delivers a higher capacity (>185 mAh/g) over the same operating voltage window compared to other widely used layered cathode materials such as $LiCoO_2$ (140 mAh/g), $LiNi_{1/3}Mn_{1/3}CO_{1/3}O_2$ (160 mAh/g), and $LiNi_{0.5}Mn_{0.3}Co_{0.2}O_2$ (175 mAh/g). Moreover, replacing expensive Co with relatively inexpensive Ni lowers the cost of raw materials.

A graphite anode was used to match the NMC 811 cathode since graphite remains the standard active material for negative electrodes despite considerable progress towards higher-capacity materials such as metal oxides, graphene, Si and Li metal. Graphite is inexpensive and non-toxic with desirable electrochemical properties including a low average voltage, minimal hysteresis, flat voltage profile, and an adequate specific capacity from 350 up to 372 mAh/g.

The electrodes were coated with high areal loadings (>2 mAh/cm$^2$), which are typical for high energy cells. While thick electrodes are important to lower the overall cell cost, they present new challenges for decreasing cell formation time. Ion transport is limited through thick electrodes, which leads to lithium plating at high charge rates. Analysis assessed the degree of lithium plating in cells that underwent the different formation protocols. These results show that very long formation times do not necessarily improve long-term performance. The optimum formation cycling protocol is intermediate in length to minimize impedance growth, improve capacity retention, and avoids lithium plating.

Electrode fabrication and cell build were completed at the U.S. Department of Energy (DOE) Battery Manufacturing R&D facility at Oak Ridge National Laboratory. All chemicals were provided by suppliers and used as received. Electrodes were prepared by coating slurries onto metal foil current collectors (Al for the cathode and Cu for the anode) using a pilot-scale slot-die coater (Frontier Industrial Technology). The cathode slurry contained 90 wt. % $LiNi_{0.8}Mn_{0.1}Co_{0.1}O_2$ powder (Targray), 5 wt. % acetylene carbon black (Denka Black), and 5 wt. % polyvinylidene difluoride (Solvay 5130) in N-methyl-2-pyrrolidone (NMP). The anode slurry contained 92 wt. % Superior SLC 1520T graphite, 2 wt. % carbon black (Timcal Super C65), and 6 wt. % polyvinylidene difluoride (Kureha 9300) in NMP. The areal capacity of the NMC 811 cathode was 2.3 mAh/cm$^2$ (11.5 mg/cm$^2$ mass loading), and the areal capacity of the graphite anode was 2.6 mAh/cm$^2$ (8.3 mg/cm$^2$ mass loading), yielding a negative to positive capacity ratio (N/P ratio) of around 1.15 in the full cells. All electrodes were calendared to 35% porosity (2.8 g/cm$^3$ electrode density for the cathode and 1.4 g/cm$^3$ for the anode) after primary drying and underwent secondary drying under vacuum at 120° C. prior to cell assembly. 1.2 M $LiPF_6$ dissolved in ethylene carbonate:ethylmethyl carbonate (EC:EMC=3:7 by weight, SoulBrain) was used as the electrolyte and the electrolyte fill factor remained consistent through all cells. Polyolefin-based separators (Celgard) with 25 μm thickness and 39% porosity were used to build the cells. Single layer pouch cells (≈100 mAh) were assembled in a dry room (dew point of less than −50° C. and relative humidity (RH) of 0.1%).

All cells were first charged to 1.5 V to avoid corrosion of the Cu current collector and rested for 6 h at 30° C. or 40° C. in an environmental chamber. Next, they went through their respective formation cycles using the protocols summarized in Table 3.

battery cycler under 5 psi stack pressure in an Espec environmental chamber at 30° C. The cells were cycled between 3.0 and 4.2 V at C/3 charge/discharge rates with a 3-h long voltage hold at the top of each charge to accelerate cell degradation. Tests for F_86 h and F_30 h cells were also interrupted periodically by hybrid pulse power characterization (HPPC) to obtain areal specific resistance (ASR) information. Rate performance was also tested within the voltage window of 3.0-4.2 V using C/5, C/3, C/2, 1C, 2C, 3C, 5C, and 10C discharge rates with a constant charging rate of C/5. 1C corresponds to 195 mAh/$g_{NMC}$ based on the discharge voltage profiles from half coin cells with lithium metal counter electrodes. The results presented here represent the average from two or three cells. Bio-Logic potentiostats/galvanostats (VSP) and EC-Lab software were used to obtain and analyze electrochemical impedance spectra (EIS). For EIS the frequency of the excitation signal was scanned from 500 kHz to 10 mHz with a sinus amplitude of 5 mV.

Duplicate sets of pouch cells were characterized after formation cycling and after long-term cycling (300 cycles). The cells were discharged to 3.0 V at C/10 and disassembled in an argon-filled glovebox for post-mortem analysis. Optical images of all harvested electrodes were taken through the glovebox window. X-ray powder diffraction (XRD) was collected on a PANalytical X'Pert system with a Cu source (λ=1.54 Å) operated at 45 kV and 40 mA with automatic divergence and anti-scatter slits. X-ray photoelectron spectroscopy (XPS, Thermo Scientific K-Alpha) was used to analyze the electrode surface chemistry after formation and after long-term cycling. The X-ray source was monochromatic Al Kα with 1486.6 eV photon energy and a spot size of 400 μm. The system used low energy Ar-ions and a low energy electron flood gun for charge compensation. The harvested electrodes were lightly rinsed with DMC solvent, dried in the glovebox, and loaded in a vacuum transfer module to avoid air and moisture exposure. The transfer module was directly inserted into the XPS chamber with a base pressure of 10-9 Torr. Scanning electron microscopy (SEM, Merlin VP, Zeiss) was used to image the electrodes.

The impact of the formation cycling protocol on SEI properties and cell performance was explored by varying the

TABLE 3

Formation protocols

| Formation Protocol | Wetting Conditions | Cycling Conditions | Total Formation Time |
|---|---|---|---|
| F_86h | Tap charge to 1.5 V after vacuum seal, then rest for 6 h at 30° C. | C/10 CCCV Charge to 4.2 V till Current < C/20 C/10 Discharge to 3.0 V, 4 Cycles Cycling at 30° C. | 86 h |
| F_30h | Tap charge to 1.5 V after vacuum seal, then rest for 6 h at 30° C. | C/2 CCCV Charge to 4.2 V till Current < C/20 C/2 Discharge to 3.0 V, 1 Cycle C/2 CCCV Charge to 4.2 V till Current < C/20 C/2 Discharge to 3.0 V, 1 Cycle Cycling at 30° C. | 30 h |
| F_26h | Tap charge to 1.5 V after vacuum seal, then rest for 6 h at 30° C. | C/10 CCCV Charge to 4.2 V till Current < C/20 C/10 Discharge to 3.0 V, 1 Cycle Cycling at 30° C. | 26 h |
| F_10h | Tap charge to 1.5 V after vacuum seal, then rest for 6 h at 30° C. | C/2 CCCV Charge to 4.2 V till Current < C/20 C/10 Discharge to 3.0 V, 1 Cycle cycling at 30° C. | 10 h |

Following formation cycling, the cells were degassed and resealed under vacuum. All cells were tested on a Maccor number of formation cycles, the cycling rates, and the electrolyte wetting temperature. Table 1 summarizes the different formation protocols adopted in this study. The longest formation protocol consisted of four C/10-C/10 charge/discharge cycles from 3.0 to 4.2 V. This protocol is similar to formation processes commonly found in the literature and serves as a baseline. A total of approximately 86 h, including the wetting step, were required to complete the entire baseline formation process.

Three-electrode cells with a Li metal reference electrode were designed to monitor the potential change on both the cathode and anode during the baseline formation process. The anode potential stays below 240 mV after the first formation cycle. The reduction of electrolyte and formation of the anode SEI take place at a higher potential (0.5-1.0 V vs. $Li^+/Li$). Since most of the SEI is formed during the first charge, the total formation time could not be reduced by optimizing the first one or two cycles and eliminating the following formation cycles.

As summarized in Table 3, faster formation protocols like F_30 h and F_26 h have fewer cycles and faster charge/discharge rates, leading to >65% reduction in total formation time. Protocol F_10 h reduces the formation time drastically to 10 h with only one high rate C/2-C/2 cycle. Protocol F_10 h@40 was identical to F_10 h except the wetting step was performed at a higher temperature of 40° C. The cells were maintained at 30° C. during wetting for all other protocols.

FIG. 7 shows the voltage profiles of NMC 811/Graphite cells for the different formation protocols. FIG. 7 (A-E) presents voltage profiles of NMC 811/Graphite cells with different formation protocols for FIG. 7A F_86 h cell; FIG. 7B F_30 h cell; FIG. 7C F_26 h cell; FIG. 7D F_10 h cell and FIG. 7E F_10 h@ 40 cell. FIG. 7F presents the coulombic efficiency of each cell during the first formation cycle and their total efficiency during formation steps. Total efficiency is calculated by multiplying the coulombic efficiency of each cycle during formation.

Figure 7A:
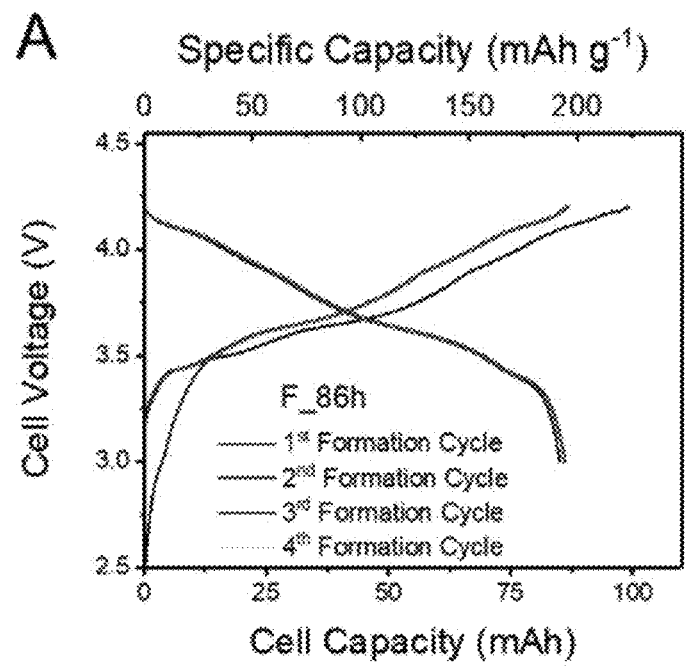
FIG. 7 (A-E) shows voltage profiles of NMC 811/Graphite cells with different formation protocols for FIG. 7A F_86 h cell.
FIG. 7B F_30 h cell.
FIG. 7C F_26 h cell.
FIG. 7D F_10 h cell and FIG. 7E F_10 h@ 40 cell.
FIG. 7F shows the coulombic efficiency of each cell during the first formation cycle (light gray) and their total efficiency during the formation steps (dark gray).
Figure 7B:
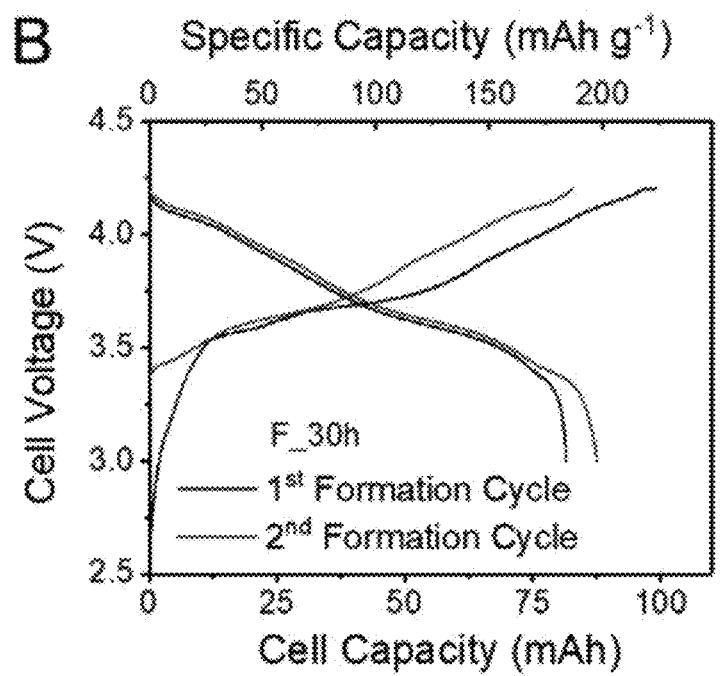
Figure 7C:
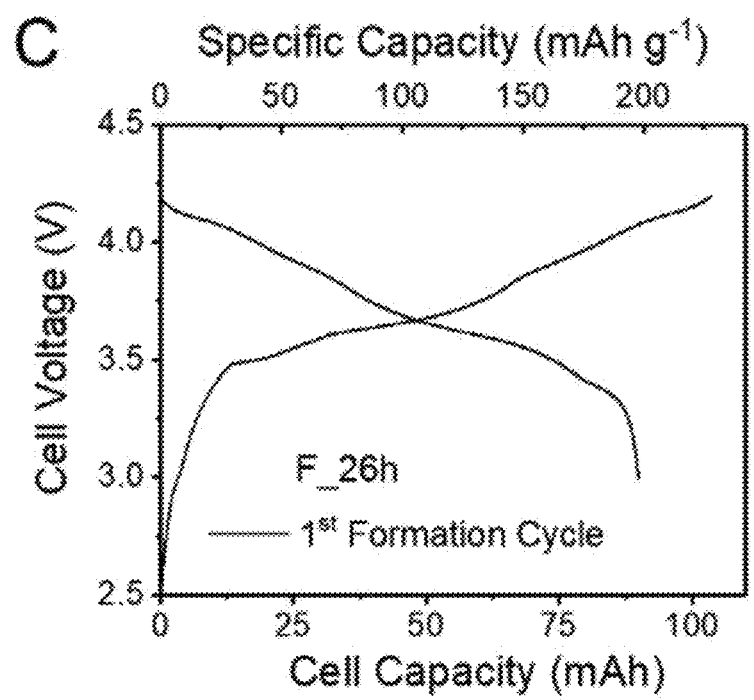
Figure 7D:
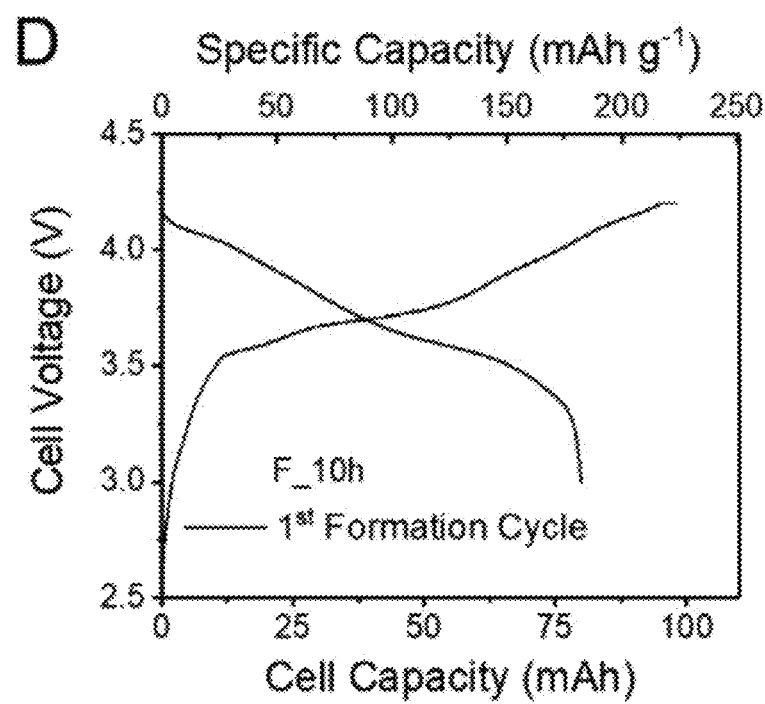
Figure 7E:
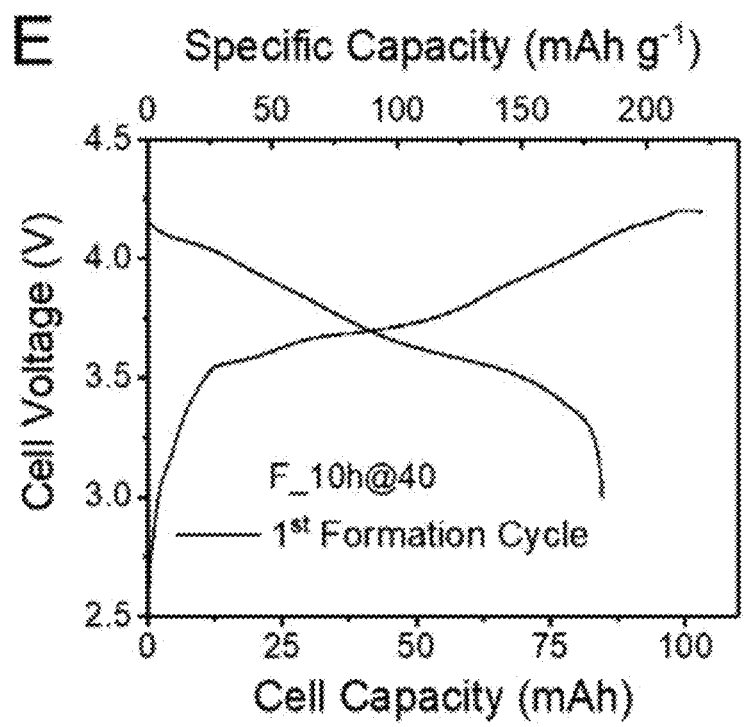
Figure 7F:
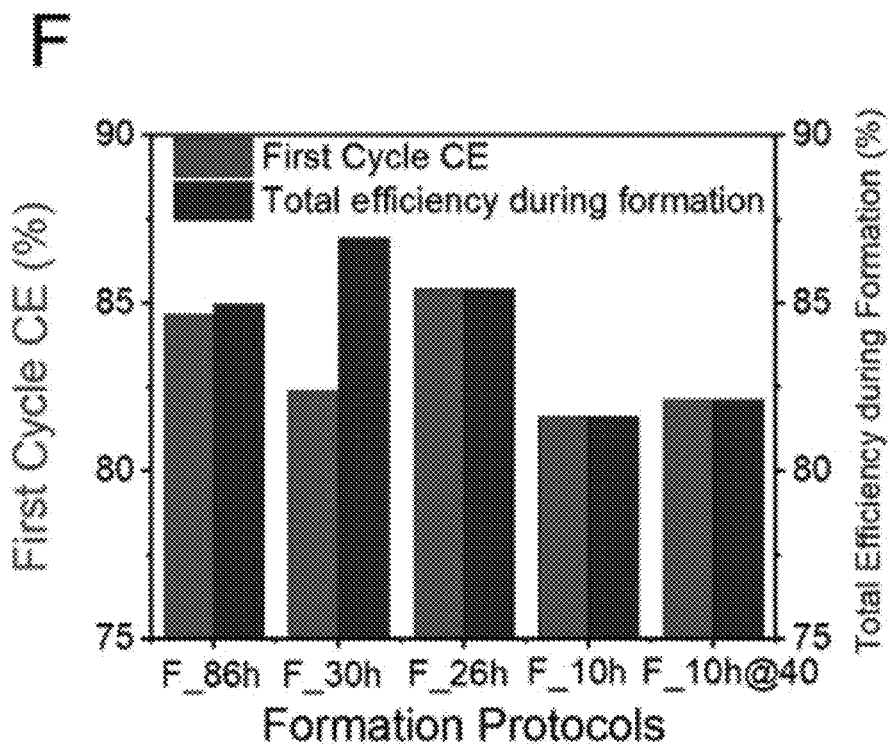

All cells delivered a high charge capacity around 224 $mAh/g_{NMC}$ during the first charge. The discharge capacities were all below 185 $mAh/g_{NMC}$ in the first discharge, yielding a first cycle Coulombic efficiency (CE) around 85%. The low CE during the first formation cycle is expected from electrolyte reduction on the anode and the corresponding formation of the SEI. FIG. 7F shows that a slower C/10 rate in the first formation cycle resulted in higher CE compared to C/2 rate. F_30 h and F_26 h cells have the least cumulative irreversible capacity loss (ICL) over all the formation steps, indicating less loss of active lithium during the critical formation steps. The longest formation protocol (F_86 h) did not have the highest coulombic efficiency. In contrast to cells with shorter formation protocols, the F_86 h anode spent much more time at low potentials, which potentially resulted in more parasitic reactions, electrolyte decomposition, and SEI growth. The increase in side-reactions is reflected in the lower total coulombic efficiency compared to F_30 h and F_26 h cells.

Optical images of anodes that were harvested from cells that were dissembled immediately after formation cycling revealed no cracks or delamination were observed in any of the anodes. No lithium plating was observed on the anodes if the formation cycles were done at a low rate of C/10 (F_26 h and F_86 h). However, lithium plating was observed on all anodes when the formation protocol included high rate C/2-C/2 cycling (F_30 h, F_10 h, and F_10 h@40). The F_30 h protocol included a slow C/10-C/10 cycle after the initial C/2-C/2 cycle, which reduced the amount of lithium plating compared to cells that were cycled at high rate without the slower recovery step (F_10 h and F_10 h@40). This indicates that some of the plated lithium is still electrochemically active at this early stage and can be recovered. We note that the sequence of the cycling conditions could also influence CE and lithium plating. For example, if the C/10-C/10 cycle was started first in the F_30 h protocol, the CE of the first cycle is expected to be the same as those from F_86 h and F_26 h, and the lithium plating could also be less significant. Increasing the temperature for the wetting step did not reduce the extent of lithium plating on the surface, which suggests that electrode wetting at 30° C. for 6 h is probably sufficient for these single layer pouch cells. Extended wetting periods may be required for multiple layer cells especially with low porosity. Analysis of the anodes immediately after formation clearly shows the importance of including a relatively slow charge/discharge cycle in the formation protocol to prevent undesirable lithium plating, which could deplete the cell inventory of active lithium and raise safety concerns during long-term cycling if the plated lithium can't be re-intercalated.

Figure 8A:
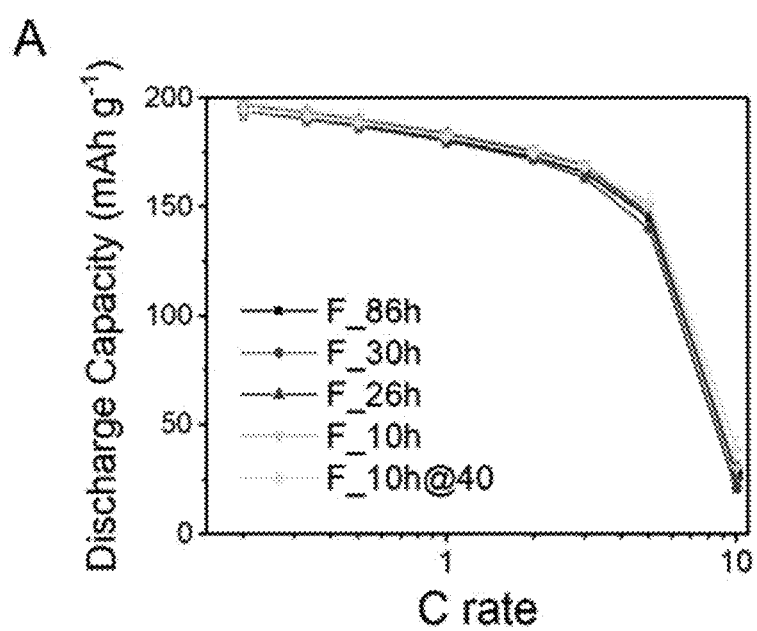
FIG. 8A is a plot of rate performance of NMC811/Graphite cells with different formation protocols.
Figure 8B:
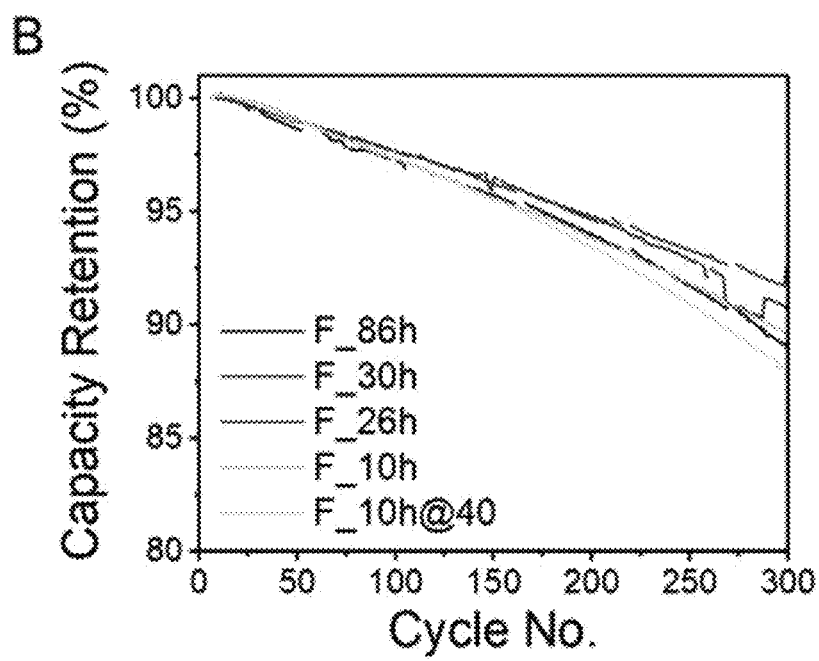
FIG. 8B is a plot of capacity retention of NMC811/Graphite cells with different formation protocols.
Figure 8C:
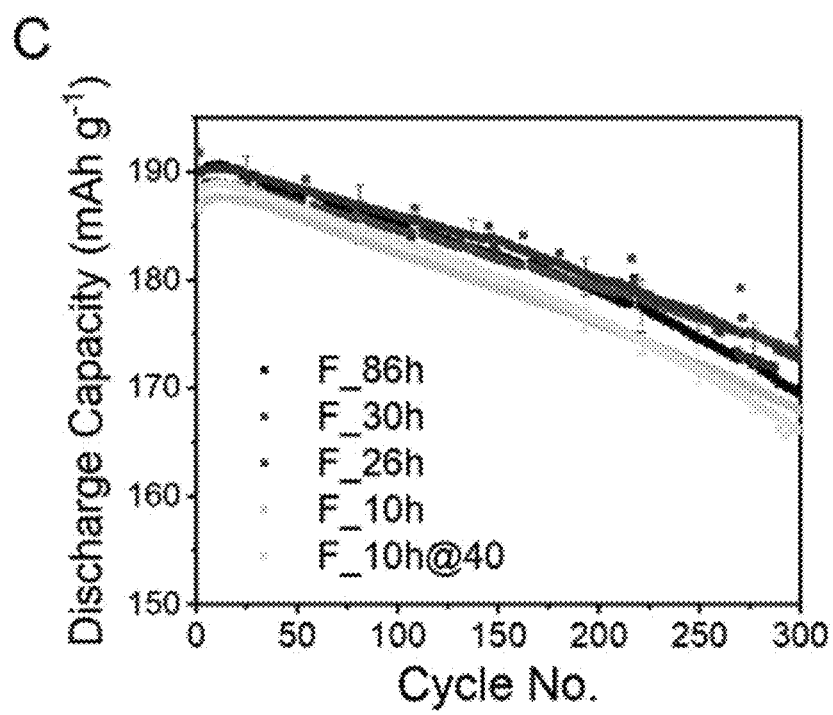
FIG. 8C is a plot of discharge capacities of NMC811/Graphite cells with different formation protocols. Voltage window: 3.0-4.2V

FIG. 8A is a plot of rate performance of NMC811/Graphite cells with different formation protocols. FIG. 8B is a plot of capacity retention of NMC811/Graphite cells with different formation protocols. FIG. 8C is a plot of discharge capacities of NMC811/Graphite cells with different formation protocols. The voltage window was 3.0-4.2V. Despite the significant differences in total formation time and lithium plating behavior, all cells formed with the various protocols exhibited similar rate performance, as demonstrated in FIG. 8A. Each data point is the average of three cycles from two identical pouch cells. All cells delivered a high discharge capacity of 194 $mAh/g_{NMC}$ at a low discharge rate of C/5 independent of the formation protocol, which indicates the plated lithium likely re-intercalated into active materials at such a low rate. All cells had excellent rate capability delivering 163 $mAh/g_{NMC}$ at 3C and 140 $mAh/g_{NMC}$ at 5C. Thus, even at very high discharge rates of 5C the cells retained 72% of their full capacity. However, further increasing the discharge rate to 10C caused a steep drop in capacity that was ascribed to mass transport limitations in active materials and porous electrodes. The drop in capacity occurred at 10C independently of the formation protocol and could be due to Li-ion saturation of the surface layer in the solid phase and/or $Li^+$ depletion in the electrolyte phase.

Figure 9A:
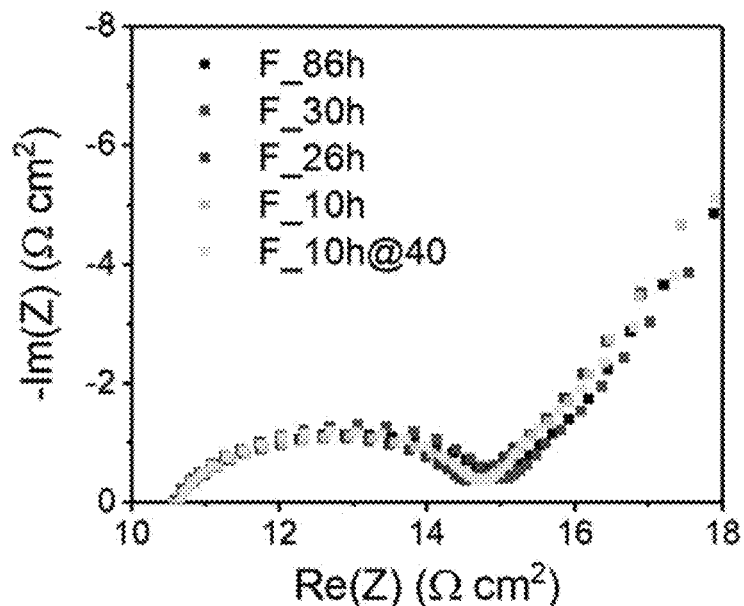
FIG. 9A is Nyquist plots of NMC811/Graphite cells after formation cycles and FIG. 9B is after aging cycles.
Figure 9B:
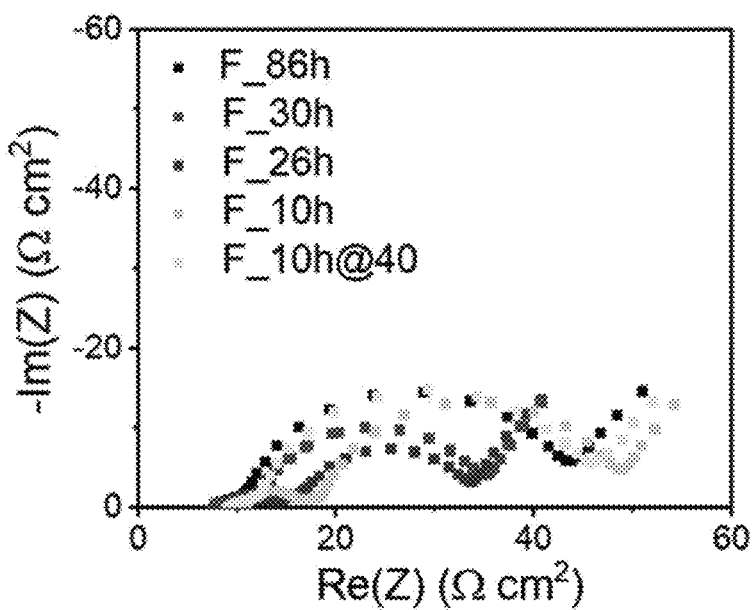
Figure 9C:
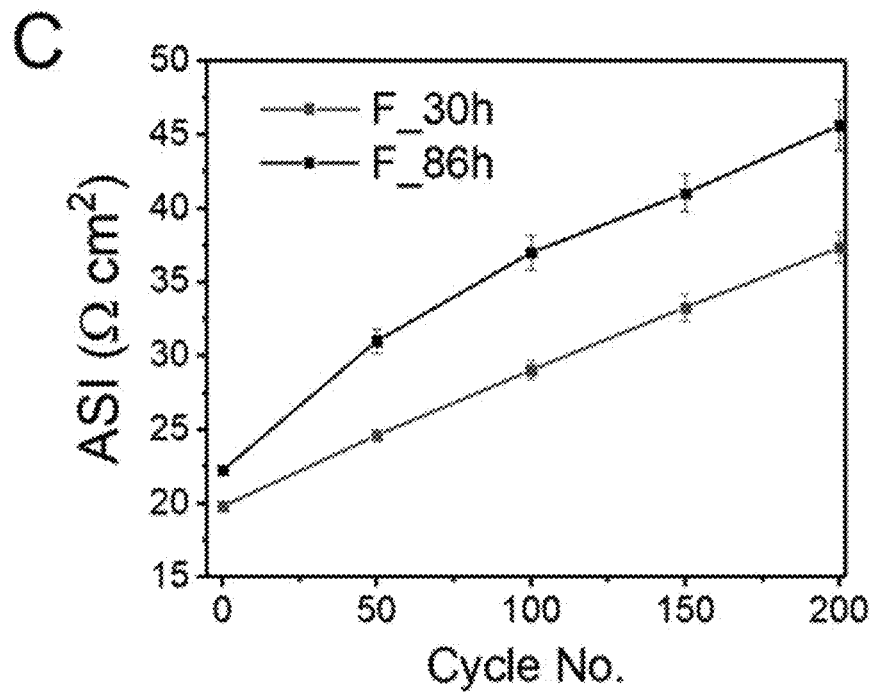
FIG. 9C is the area specific resistance (ASI) of F_86 h and F_30 h cells during aging cycles.
Figure 9D:
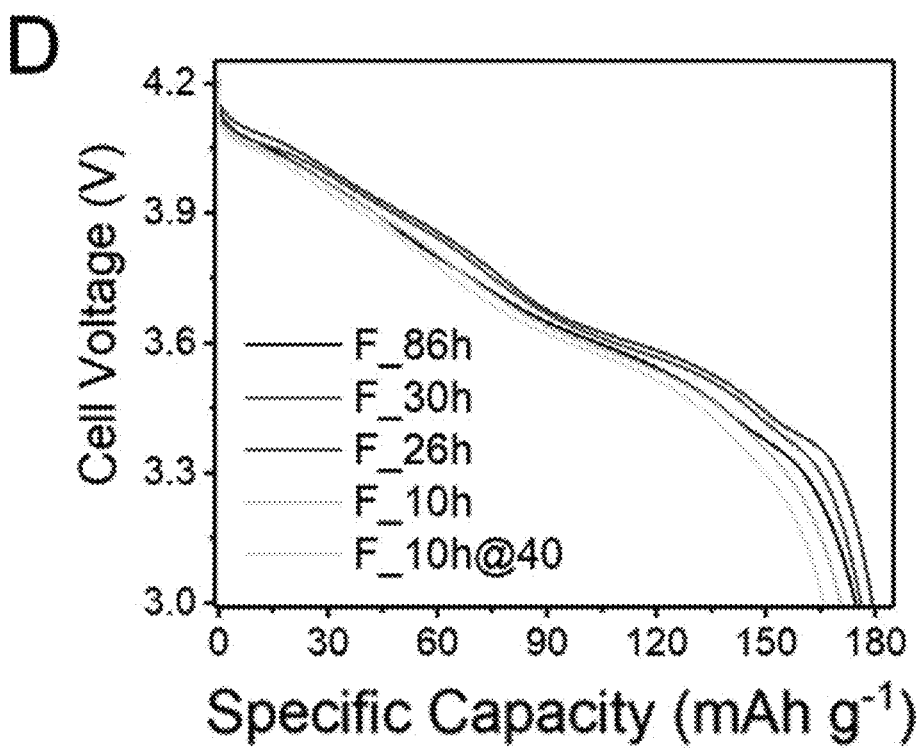
FIG. 9D is the discharge capacity of cells after aging cycles at 0.1C rate.

FIG. 9A is Nyquist plots of NMC811/Graphite cells after formation cycles and FIG. 9B is after aging cycles. FIG. 9C is the area specific resistance of F_86 h and F_30 h cells during aging cycles. FIG. 9D is the discharge capacity of cells after aging cycles at 0.1C rate. FIG. 9A displays EIS results from cells after formation cycling, which were charged to 3.8 V cell voltage for EIS measurements. All cells exhibited similar cell impedance after formation cycling independent of the formation protocol, consistent with their similar rate performance.

The impact of different formation protocols on the long-term cycling performance at C/3 rate is shown in FIG. 8B and FIG. 8C. F_30 h cells demonstrated the highest capacity (173.5 mAh/g) and capacity retention (91.2%) after 300 aging cycles, even though the first formation cycle was at a high rate of C/2-C/2. The slowest formation protocol (F_86 h) did not result in higher capacity retention compared to formation cycles that were significantly shorter (F_30 h and F_26 h). F_10 h and F_10 h@40 had slightly lower initial discharge capacities (3-5 mAh/g lower) compared to the other cells due to lithium plating and active lithium loss during the formation steps. This discharge capacity recovered slightly during the first 10 cycles, which indicates that some of the plated lithium was electrochemically active and stripped during the slower aging cycles. However, F_10 h and F_10 h@40 faded faster than the cells with longer formation protocols, finishing with 89.6% and 88.1% capacity retention, respectively. Nonetheless, at the end of 300 cycles the capacity retention of all cells were within 3% compared to the baseline F_86 h cells. This is significant given that the length of the formation protocols varied by over a factor of 8. The choice of formation protocol had a larger impact on the total cell capacity, which varied by 6% from 173.5 mAh/g for F_30 h to 166.1 mAh/g for F_10 h@40 after 300 cycles.

Capacity fade is driven primarily by loss of active lithium and impedance rise. More detailed electrochemical characterization was carried out to distinguish contributions from the different causes. While all the cells had similar resistance at the beginning of life, the resistance grew at different rates depending on the formation protocols. Hybrid pulse power characterization (HPPC) measured the area specific resistance (ASR) of F_86 h and F_30 h cells at about 50% state-of-discharge (SOD) after every 50 cycles (FIG. 9C). The resistance of both cells started around 20 $\Omega cm^2$ after the formation cycles, consistent with the EIS results shown in FIG. 9A. However, F_86 h cells exhibited a much faster resistance growth than F_30 h cells as cycling went on, consistent with their faster capacity fade. The F_86 h cells also had lower coulombic efficiency during the aging cycles, which suggests that the SEI layer formed during the long formation steps did not passivate the anode surface as effectively, leading to continuous parasitic reactions, SEI growth, and impedance rise.

EIS further confirmed that the formation protocol impacted cell impedance rise. EIS was obtained on cells after 300 aging cycles at 3.8 V cell voltage (FIG. 9B). The full cell EIS measured here is the convoluted impedance of both the cathode and anode. However, full cell impedance is typically dominated by the cathode for similar cell chemistries. The high frequency arc in the Nyquist plot arises mainly from contributions from the electronic contact resistance between carbon additives and active material. The mid-frequency arc corresponds to interfacial phenomenon. The cell resistance was calculated by fitting the EIS spectra using the equivalent circuit shown in FIG. 10, and the results are summarized in Table 4.

TABLE 4

Figure 10:
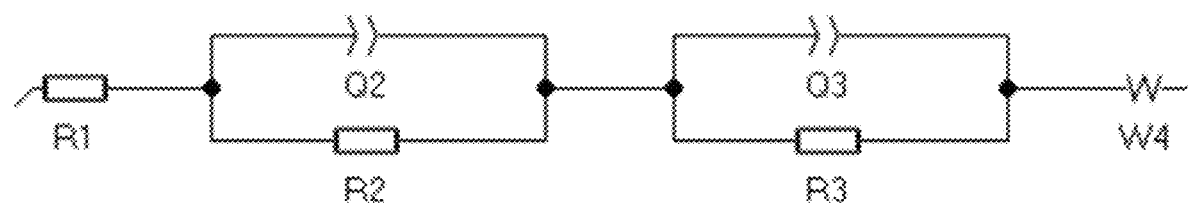
FIG. 10 is an equivalent circuit used to model the impedance spectra, where R is a resistor, Q is a constant phase element and W is the Warburg element.

Cell resistance calculated from EIS using the equivalent circuit provided in FIG. 10.

| Formation Protocol | Cell Resistance (R1 + R2 + R3/$\Omega$ cm$^2$) |
| --- | --- |
| F_86h | 40 |
| F_30h | 31 |
| F_26h | 34 |
| F_10h | 44 |
| F_10H@40 | 42 |

The trends in impedance rise matched the trends in capacity retention (FIG. 8B). F_10 h and F_10 h@40 cells exhibited the greatest impedance rise, while F_30 h and F_26 h cells showed the least. F_86 h cells had intermediate impedance rise, consistent with their intermediate capacity retention. The results of both HPPC tests and EIS measurements show that longer formation protocols such as F_86 h are not necessarily optimal for long term performance.

Measurements at low rate minimize the impact of cell resistance and isolate capacity fade due to loss of lithium inventory. FIG. 9D shows the discharge voltage profile at a rate of C/10 for all cells after aging cycles. While F_86 h, F_30 h, and F_26 h cells all had a similar discharge capacity around 176 mAh/g, F_10 h and F_10 h@40 cells had lower capacity (170 and 166 mAh/g, respectively), indicating more active lithium was lost in these cells during cycling.

After the aging cycles, anodes were recovered from each cell in the glovebox. No obvious lithium plating was observed in F_86 h and F_26 h cells, confirming that low-rate cycling during formation effectively prevents lithium plating. More significantly, F_30 h cells showed no evidence of lithium plating after long-term cycling, even though some lithium plated after formation. This further confirms that some lithium plating is reversible. F_10 h and F_10 h@40 cells still showed obvious lithium plating after long-term cycling, although it was somewhat less pronounced than after formation. In addition, F_10 h@40 exhibited more plated lithium than the F_10 h cell, consistent with the greater capacity fade from loss of active lithium (FIG. 9D). The slow C/10 cycle in the F_30 h protocol was necessary to recover most plated lithium and prevent irreversible lithium plating during extensive long-term cycling.

The SEM images of uncycled anodes showed graphite particles with clean surfaces. After aging cycles, all graphite surfaces were covered by electrolyte decomposition products. The SEM images showed that the SEI layers were thicker on F_86 h graphite anodes compared to F_30 h and F_26 h anodes. This difference matched well with the impedance results, which indicated the F_86 h baseline cells had faster impedance growth, more active lithium loss, and ended with a higher resistance. Moreover, lithium deposits were clearly identified on cycled F_10 h and F_10 h@40 graphite anodes. The microscopy images reinforce the importance of optimizing formation cycling to avoid thick SEI build-up and prevent lithium plating.

Figure 11A:
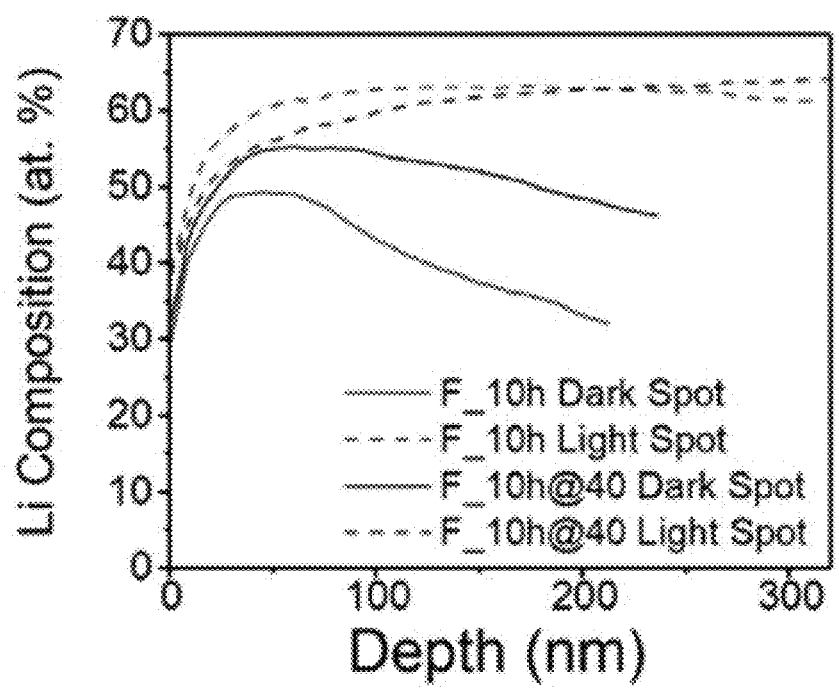
FIG. 11A is lithium composition from light spots (where lithium plated, dashed lines) and dark spots (where lithium did not plate, solid lines) on F_10 h and F_10 h@40 anodes. Surface C, O, Li, and P compositions are shown in FIG. 11B for F_86 h anodes.
Figure 11B:
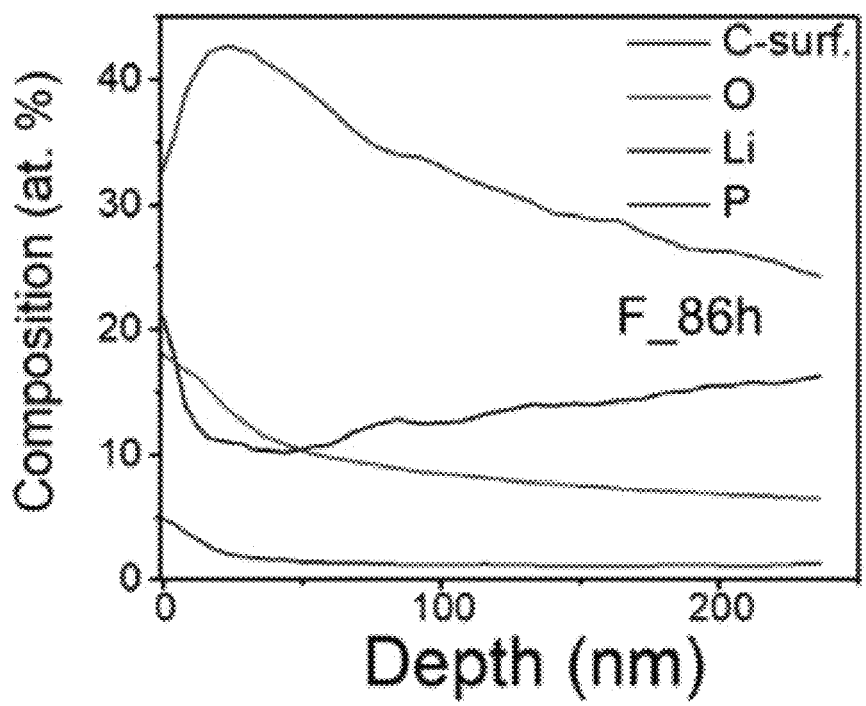
FIG. 11 A-C are XPS sputter depth profiles of cycled anodes.
in FIG. 11C for F_30 h anodes.
in FIG. 11D for F_26 h anode.
in FIG. 11E for F_10 h anodes, dark spots; and in FIG. 11F for F_10 h@40 anodes, dark spots.
Figure 11C:
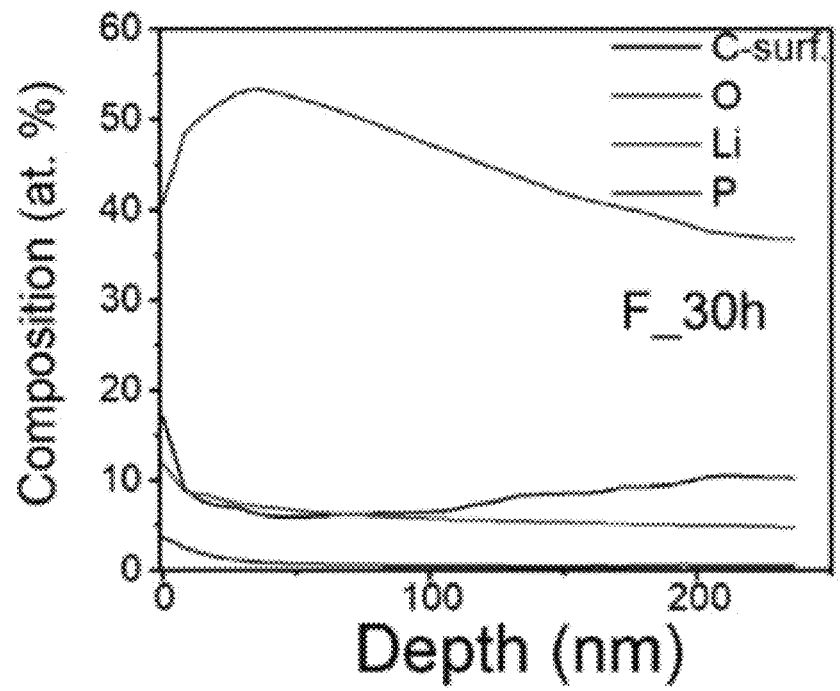
Figure 11D:
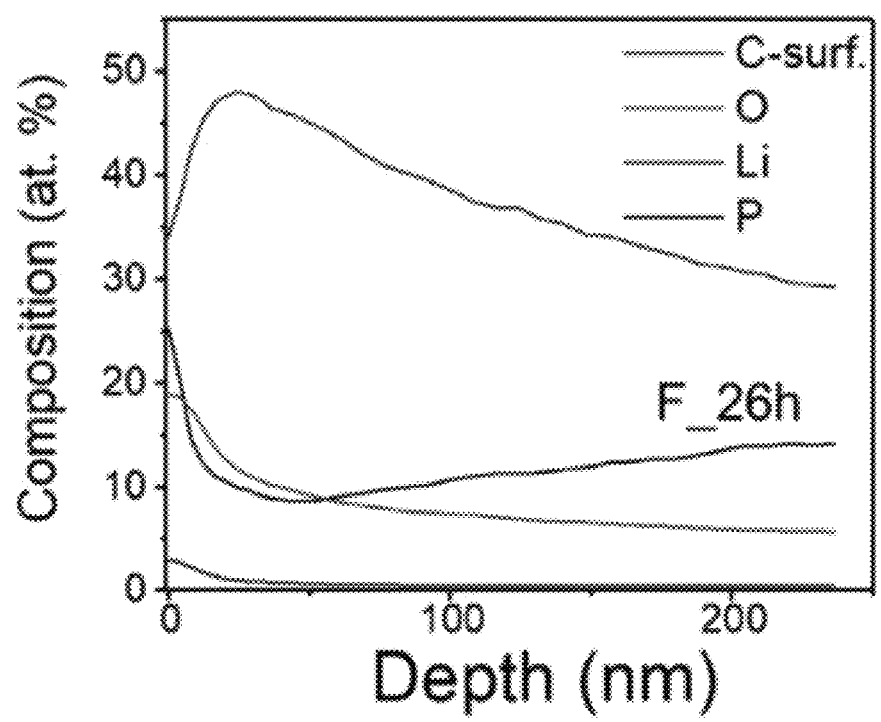
Figure 11E:
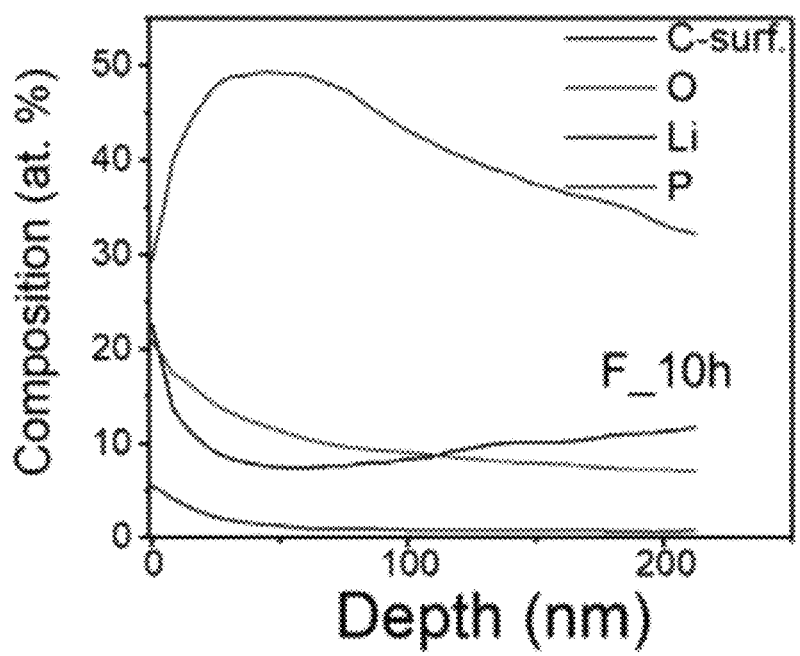
Figure 11F:
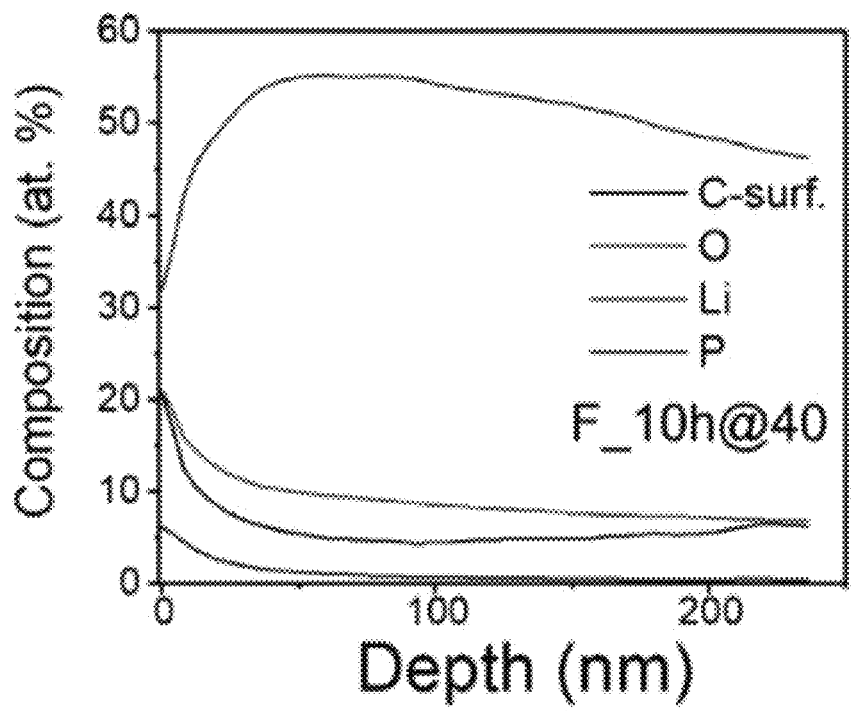
Figure 12A:
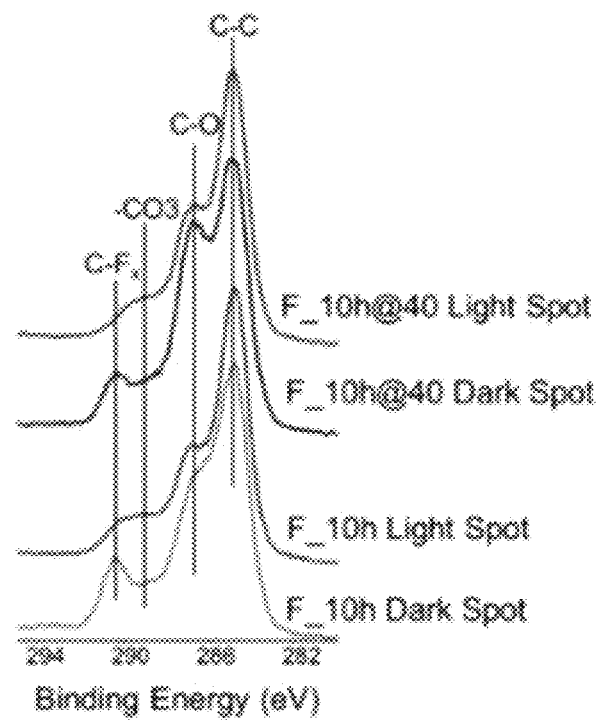
FIG. 12A is core level spectra of carbon from light spots (where lithium plated) and dark spots (where lithium did not plate) on F_10 h and F_10 h@40 anodes. First derivative of XPS sputter depth profiles for surface C, O, Li, and P atomic compositions are provided for FIG. 12B for F_86 h anodes.
Figure 12B:
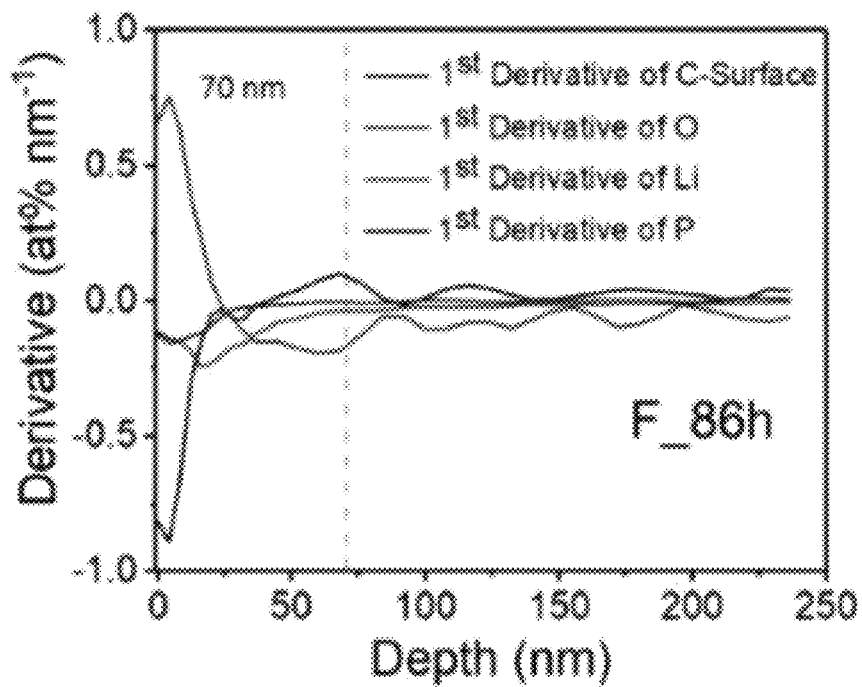
FIG. 12C for F_30 h anodes.
FIG. 12D for F_26 h anode.
FIG. 12E for F_10 h anodes, dark spots.
FIG. 12F for F_10 h@40 anodes, dark spots.

To further reveal the surface chemistry differences and estimate the thickness of SEI layers, XPS depth profiles were employed to investigate cycled anodes. F_10 h and F_10 h@40 anodes had visually heterogenous surfaces with light spots where lithium plating had occurred and dark spots where no obvious lithium plating had taken place. Therefore, XPS measurements were taken on both types of surfaces. Note that the depth was calculated based on the assumption that the SEI has the same etching rate as a $SiO_2$ standard. Therefore, the reported values do not reflect the absolute thickness of SEI layers but provide a basis for comparison across the different anode surfaces. FIG. 11A shows the atomic percentage of Li as a function of etching depth on both spots of F_10 h and F_10 h@40 anodes. Each electrode demonstrated a higher Li concentration at the locations where Li metal had plated. Lithium metal is highly reactive with the electrolyte, which leads to more electrolyte decomposition and SEI formation at these locations. Moreover, the C 1s signals from spots where lithium plated (light spots) showed a larger amount of C—O and C=O bonds due to the thicker SEI. Lithium plating also reduced the relative intensity of the C—$F_x$ peaks from the polyvinylidene fluoride binder (FIG. 12A). Attenuation of the signals from the binder is additional evidence that a thicker reaction layer forms after plating.

FIG. 11 A-C are XPS sputter depth profiles of cycled anodes. FIG. 11A is lithium composition from light spots (where lithium plated, dashed lines) and dark spots (where lithium did not plate, solid lines) on F_10 h and F_10 h@40 anodes. Surface C, O, Li, and P compositions are shown in FIG. 11B for F_86 h anodes; in FIG. 11C for F_30 h anodes; in FIG. 11D for F_26 h anode; in FIG. 11E for F_10 h anodes, dark spots; and in FIG. 11F for F_10 h@40 anodes, dark spots.

Elemental profiles from all five cycled anodes are displayed in FIG. 11B-F. These depth profiles are taken from locations where no visible Li plating occurred. Atomic compositions of four elements (surface C, O, Li, and P) were selected since they are directly associated with SEI components and could be used to estimate the SEI thickness.

Figure 12C:
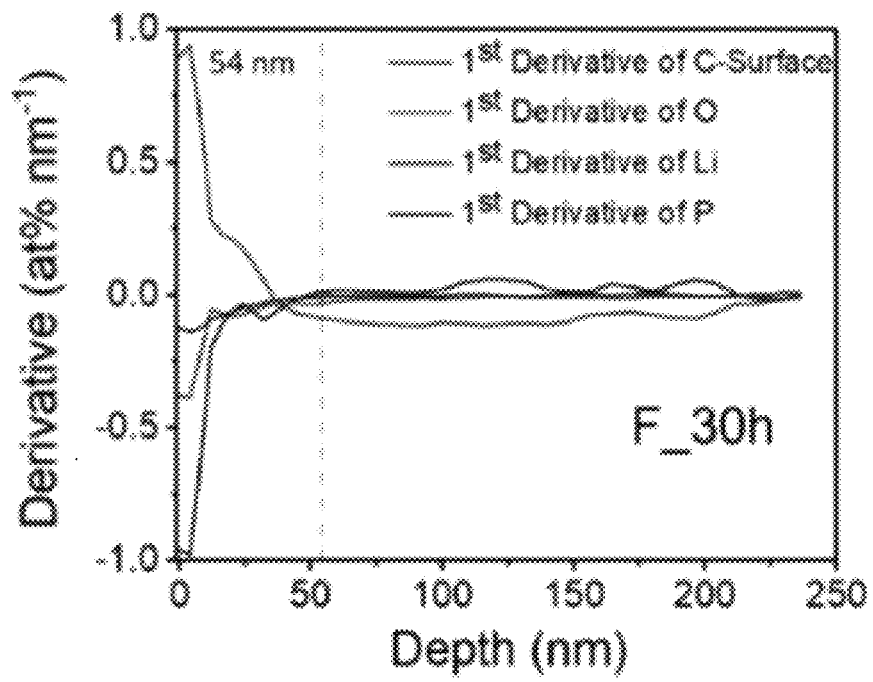
Figure 12D:
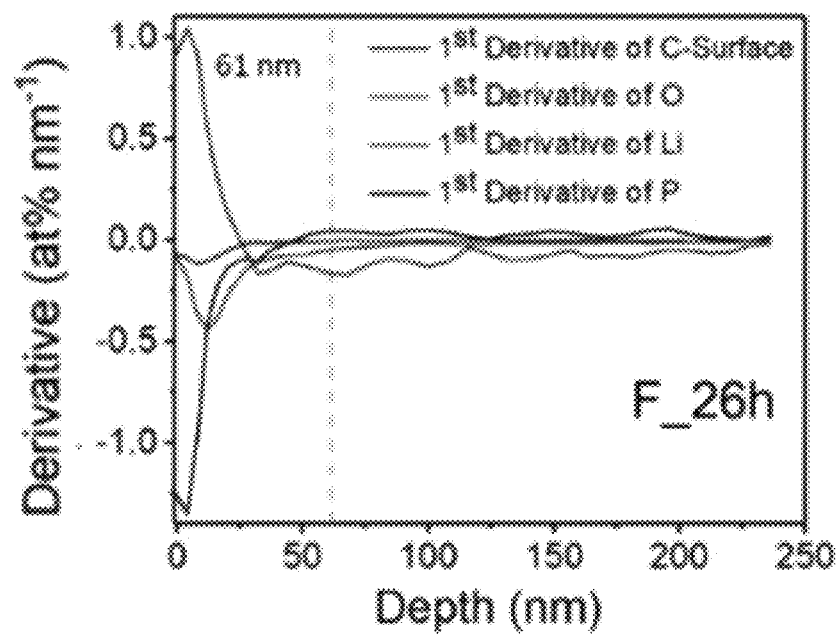
Figure 12E:
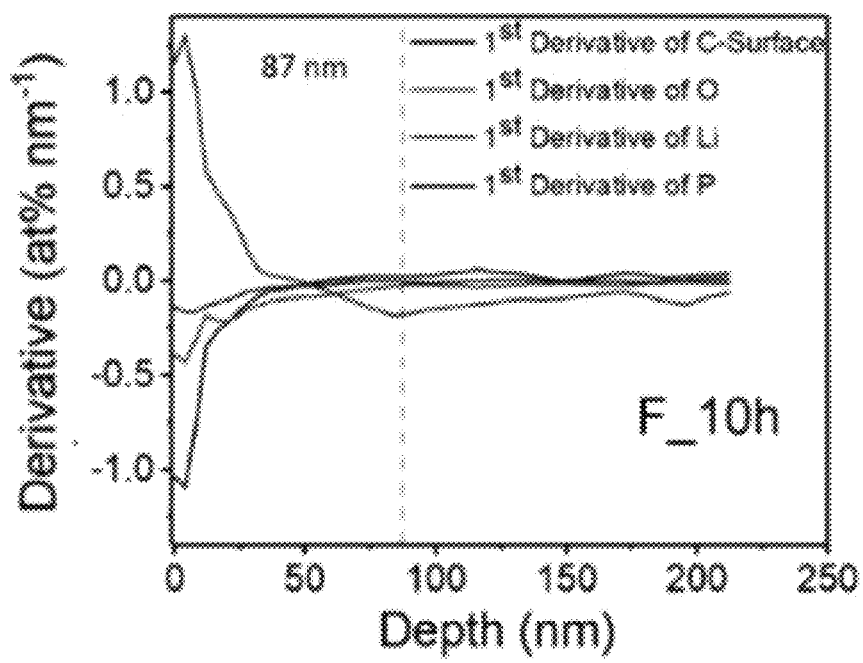
Figure 12F:
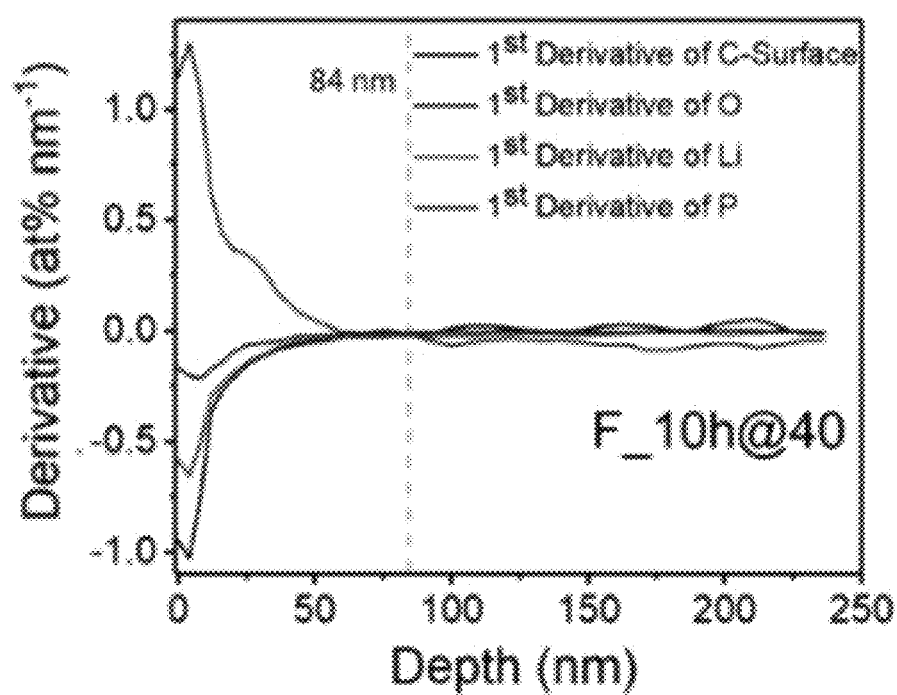

To define the SEI thickness, the first derivative of the atomic percentage of the four surface elements was taken as a function of depth, as shown in FIG. 12B-F. FIG. 12A is core level spectra of carbon from light spots (where lithium plated) and dark spots (where lithium did not plate) on F_10 h and F_10 h@40 anodes. First derivative of XPS sputter depth profiles for surface C, O, Li, and P atomic compositions are provided for FIG. 12B for F_86 h anodes; FIG. 12C for F_30 h anodes; FIG. 12D for F_26 h anode; FIG. 12E for F_10 h anodes, dark spots; and FIG. 12F for F_10 h@40 anodes, dark spots.

It was also assumed that the atomic percentage would remain constant (first derivative ≈0) in the bulk. Based on these assumptions, F_10 h@40 h and F_10 h had the thickest SEI layers, which were over 80 nm. This result is consistent with greater electrolyte decomposition, higher impedance growth, and lower capacity retention. F_86 h, F_30 h, and F_26 h formation protocols all yielded much thinner SEI layers overall. However, the F_86 h anodes seem to have a thicker SEI layer compared to F_30 h and F_26 h, which further indicates that an extended formation time may not be optimal for stable SEI formation.

Possible structural changes on the cathode side were also investigated. The XRD patterns of three cycled cathodes harvested from F_86 h, F_30 h, and F_10 h cells were compared. Although the full cells exhibited different capacity retention, all cathodes retained good crystallinity with no other phases (spinel or rock-salt) identified. The high intensity ratio between (003) and (104) peaks for all cycled cathodes, together with the well-defined splitting of (006)/(102) and (108)/(110) doublets, confirms the well-preserved R3m layered structure. SEM images of cycled cathodes from F_10 h cells, which exhibited a low capacity retention after aging cycles, showed no cracks or delamination, and the primary particles were still well agglomerated with each other, indicating minimal active materials loss. The characterization of cycled cathodes shows minimal degradation of the bulk active material or electrode structure on the cathode side. Therefore, it is believed that most of the differences in capacity retention for cells that underwent different formation protocols arise from differences in the passivation of the anode. The best formation protocols passivate the anode effectively, resulting in higher coulombic efficiency and lower impedance rise.

Faster formation protocols for NMC811/Graphite full cells using a standard electrolyte without additives were proposed and investigated. The shortest formation protocols (10 h) resulted in lithium plating, faster impedance growth, and the poorest long-term capacity and capacity retention. Formation protocols that were intermediate in length (26-30 h) yielded the best long-term performance with minimal impedance rise. Further increasing the time for the formation protocol did not offer any improvements. Instead, the conventional slow formation cycling protocol led to slightly greater impedance rise and lower capacity retention. Lithium plating occurred in all cells that were subjected to a fast C/2 charge during formation. However, the lithium metal was still electrochemically active and could be stripped provided the following cycle was at sufficiently low rate. The best electrochemical performance was obtained in cells where the formation protocol began with one quick C/2 cycle followed by a slow C/10 recovery cycle.

This invention can be embodied in other forms without departing from the spirit or essential attributes thereof. Reference should therefore be made to the following claims to determine the scope of the invention.

We claim:

1. A method for fast formation lithium ion cycling for rechargeable batteries including at least one cell, comprising the steps of:
   1) charging the cell from open-circuit voltage (OCV) up to 80-90% of an upper cutoff voltage (UCV) of from 4-5 V at a charging (C) rate not less than 0.5 C and not more than 1.5 C;
   2) charging the cell from 80-90% of UCV to 97-100% of UCV at a charging (C) rate of not less than 0.2 C and not more than 0.5 C;
   3) discharging the cell from 97-100% of UCV to 80-90% of UCV at a discharging (C) rate of not less than 0.2 C and not more than 0.5 C; and,
   repeating steps 2) and 3) up to 2-10 times where the charging and discharging rates are progressively increased by 25-75%.

2. The method of claim 1, wherein the cell comprises $LiNi_xMn_yCo_{1-x-y}$(NMC)/Graphite, wherein $x \leq 0.5$ and $y \leq 0.4$, and the method comprises the steps of:
   1) charging the cell from open-circuit voltage (OCV) of ~3 V up to 3.7-3.9 V at a C rate not less than 0.5 C (80 mA/g-NMC) and not more than 1.5 C (240 mA/g-NMC);
   2) charging the cell from 3.7-3.9 V to maximum cell voltage of 4.2-4.3 V at a C rate of not less than 0.2 C (32 mA/g-NMC) and not more than 0.5 C (80 mA/g-NMC); and
   3) discharging the cell from 4.2-4.3 V to 3.7-3.9 V at a C rate of not less than 0.2 C (32 mA/g-NMC) and not more than 0.5 C (80 mA/g-NMC).

3. The method of claim 2, further comprising the steps of:
   4) charging the cell from 3.7-3.9 V to maximum cell voltage of 4.2-4.3 V at a C rate of not less than 0.5 C (80 mA/g-NMC) and not more than 0.75 C (120 mA/g-NMC);
   5) discharging the cell from 4.2-4.3 V to 3.7-3.9 V at a C rate of not less than 0.5 C (80 mA/g-NMC) and not more than 0.75 C (120 mA/g-NMC).

4. The method of claim 3, further comprising the steps of:
   6) charging the cell from 3.7-3.9 V to maximum cell voltage of 4.2-4.3 V at a C rate of not less than 0.75 C (120 mA/g-NMC) and not more than 1.2 C (192 mA/g-NMC); and
   7) discharging the cell from 4.2-4.3 V to 3.7-3.9 V at a C rate of not less than 0.75 C (120 mA/g-NMC) and not more than 1.2 C (192 mA/g-NMC).

5. The method of claim 4, further comprising the steps of:
   8) charging the cell from 3.7-3.9 V to maximum cell voltage of 4.2-4.3 V at a C rate of not less than 1.2 C (192 mA/g-NMC) and not more than 1.5 C (240 mA/g-NMC); and
   9) discharging the cell from 4.2-4.3 V to 3.7-3.9 V at a C rate of not less than 1.2 C (192 mA/g-NMC) and not more than 1.5 C (240 mA/g-NMC).

6. The method of claim 5, further comprising the steps of:
   10) charging the cell from 3.7-3.9 V to maximum cell voltage of 4.2-4.3 V at a C rate of not less than 1.5 C (240 mA/g-NMC) and not more than 2.0 C (320 mA/g-NMC); and 11) discharging the cell from 4.2-4.3 V to 2.5 V at a C rate not less than 0.5 C (80 mA/g-NMC) and not more than 1.5 C (240 mA/g-NMC).

7. The method of claim 1, wherein the cell comprises $LiNi_xMn_yCo_{1-x-y}O_2$ (NMC)/Graphite, wherein $0.5 \leq x \leq 1.8$ and $0.1 \leq y \leq 0.4$, and the method comprises the steps of:
  1) charging the cell from open-circuit voltage (OCV) of ~3 V up to 3.7-3.9 V at a C rate not less than 0.5 C (95 mA/g-NMC) and not more than 1.5 C (285 mA/g-NMC);
  2) charging the cell from 3.7-3.9 V to maximum cell voltage of 4.2-4.4 V at a C rate of not less than 0.2 C (38 mA/g-NMC) and not more than 0.5 C (95 mA/g-NMC); and
  3) discharging the cell from 4.2-4.4 V to 3.7-3.9 V at a C rate of not less than 0.2 C (38 mA/g-NMC) and not more than 0.5 C (95 mA/g-NMC).

8. The method of claim 7, further comprising the steps of:
  4) charging the cell from 3.7-3.9 V to maximum cell voltage of 4.2-4.4 V at a C rate of not less than 0.5 C (95 mA/g-NMC) and not more than 0.75 C (142.5 mA/g-NMC); and
  5) discharging the cell from 4.2-4.4 V to 3.7-3.9 V at a C rate of not less than 0.5 C (95 mA/g-NMC) and not more than 0.75 C (142.5 mA/g-NMC).

9. The method of claim 8, further comprising the steps of:
  6) charging the cell from 3.7-3.9 V to maximum cell voltage of 4.2-4.4 V at a C rate of not less than 0.75 C (142.5 mA/g-NMC) and not more than 1.2 C (228 mA/g-NMC); and
  7) discharging the cell from 4.2-4.4 V to 3.7-3.9 V at a C rate of not less than 0.75 C (142.5 mA/g-NMC) and not more than 1.2 C (228 mA/g-NMC).

10. The method of claim 9, further comprising the steps of:
  8) charging the cell from 3.7-3.9 V to maximum cell voltage of 4.2-4.4 V at a C rate of not less than 1.2 C (228 mA/g-NMC) and not more than 1.5 C (285 mA/g-NMC); and
  9) discharging the cell from 4.2-4.4 V to 3.7-3.9 V at a C rate of not less than 1.2 C (228 mA/g-NMC) and not more than 1.5 C (285 mA/g-NMC).

11. The method of claim 10, further comprising the steps of:
  10) charging the cell from 3.7-3.9 V to maximum cell voltage of 4.2-4.4 V at a C rate of not less than 1.5 C (285 mA/g-NMC) and not more than 2.0 C (380 mA/g-NMC); and
  11) discharging the cell from 4.2-4.4 V to 2.5 V at a C rate not less than 0.5 C (95 mA/g-NMC) and not more than 1.5 C (285 mA/g-NMC).

12. The method of claim 1, wherein the cell comprises $LiFePO_4$ (LFP)/graphite and the method comprises the steps of:
  1) charging the cell from open-circuit voltage (OCV) of ~2.5 V up to 3.2-3.4 V at a C rate not less than 0.5 C (75 mA/g-LFP) and not more than 1.5 C (225 mA/g-LFP);
  2) charging the cell from 3.2-3.4 V to maximum cell voltage of 3.6-3.7 V at a C rate of not less than 0.2 C (30 mA/g-LFP) and not more than 0.5 C (75 mA/g-LFP); and
  3) discharging the cell from 3.6-3.7 V to 3.2-3.4 V at a C rate of not less than 0.2 C (30 mA/g-LFP) and not more than 0.5 C (75 mA/g-LFP).

13. The method of claim 12, further comprising the steps of:
  4) charging the cell from 3.2-3.4 V to maximum cell voltage of 3.6-3.7 V at a C rate of not less than 0.5 C (75 mA/g-LFP) and not more than 0.75 C (112.5 mA/g-LFP); and
  5) discharging the cell from 3.6-3.7 V to 3.2-3.4 V at a C rate of not less than 0.5 C (75 mA/g-LFP) and not more than 0.75 C (112.5 mA/g-LFP).

14. The method of claim 13, further comprising the steps of:
  6) charging the cell from 3.2-3.4 V to maximum cell voltage of 3.6-3.7 V at a C rate of not less than 0.75 C (112.5 mA/g-LFP) and not more than 1.2 C (180 mA/g-LFP); and
  7) discharging the cell from 3.6-3.7 V to 3.2-3.4 V at a C rate of not less than 0.75 C (112.5 mA/g-LFP) and not more than 1.2 C (180 mA/g-LFP).

15. The method of claim 14, further comprising the steps of:
  8) charging the cell from 3.2-3.4 V to maximum cell voltage of 3.6-3.7 V at a C rate of not less than 1.2 C (180 mA/g-LFP) and not more than 1.5 C (225 mA/g-LFP); and
  9) discharging the cell from 3.6-3.7 V to 3.2-3.4 V at a C rate of not less than 1.2 C (180 mA/g-LFP) and not more than 1.5 C (225 mA/g-LFP).

16. The method of claim 15, further comprising the steps of:
  10) charging the cell from 3.2-3.4 V to maximum cell voltage of 3.6-3.7 V at a C rate of not less than 1.5 C (225 mA/g-LFP) and not more than 2.0 C (300 mA/g-LFP); and
  11) discharging the cell from 3.6-3.7 V to 2.5 V at a C rate not less than 0.5 C (75 mA/g-LFP) and not more than 1.5 C (225 mA/g-LFP).

17. The method of claim 1, wherein the cell comprises $LiNi_xCo_yAl_{1-x-y}O_2$ (NCA)/Graphite, wherein $0.5 < x \leq 0.85$ and $0.1 \leq y < 0.25$, and the method comprises the steps of:
  1) charging the cell from open-circuit voltage (OCV) of ~3 V up to 3.7-3.9 V at a C rate not less than 0.5 C (100 mA/g-NCA) and not more than 1.5 C (300 mA/g-NCA);
  2) charging the cell from 3.7-3.9 V to maximum cell voltage of 4.2-4.3 V at a C rate of not less than 0.2 C (40 mA/g-NCA) and not more than 0.5 C (100 mA/g-NCA); and
  3) discharging the cell from 4.2-4.3 V to 3.7-3.9 V at a C rate of not less than 0.2 C (40 mA/g-NCA) and not more than 0.5 C (100 mA/g-NCA).

18. The method of claim 17, further comprising the steps of:
  4) charging the cell from 3.7-3.9 V to maximum cell voltage of 4.2-4.3 V at a C rate of not less than 0.5 C (100 mA/g-NCA) and not more than 0.75 C (150 mA/g-NCA); and
  5) discharging the cell from 4.2-4.3 V to 3.7-3.9 V at a C rate of not less than 0.5 C (100 mA/g-NCA) and not more than 0.75 C (150 mA/g-NCA).

19. The method of claim 18, further comprising the steps of:
  6) charging the cell from 3.7-3.9 V to maximum cell voltage of 4.2-4.3 V at a C rate of not less than 0.75 C (150 mA/g-NCA) and not more than 1.2 C (240 mA/g-NCA); and
  7) discharging the cell from 4.2-4.3 V to 3.7-3.9 V at a C rate of not less than 0.75 C (150 mA/g-NCA) and not more than 1.2 C (240 mA/g-NCA).

20. The method of claim 19, further comprising the steps of:
   8) charging the cell from 3.7-3.9 V to maximum cell voltage of 4.2-4.3 V at a C rate of not less than 1.2 C (240 mA/g-NCA) and not more than 1.5 C (300 mA/g-NCA); and
   9) discharging the cell from 4.2-4.3 V to 3.7-3.9 V at a C rate of not less than 1.2 C (240 mA/g-NCA) and not more than 1.5 C (300 mA/g-NCA).

21. The method of claim 20, further comprising the steps of:
   10) charging the cell from 3.7-3.9 V to maximum cell voltage of 4.2-4.3 V at a C rate of not less than 1.5 C (300 mA/g-NCA) and not more than 2.0 C (400 mA/g-NCA); and
   11) discharging the cell from 4.2-4.3 V to 2.5 V at a C rate not less than 0.5 C (100 mA/g-NCA) and not more than 1.5 C (300 mA/g-NCA).

22. The method of claim 1, wherein the cell comprises $LiCoO_2$ (LCO)/graphite and the method comprises the steps of:
   1) charging the cell from open-circuit voltage (OCV) of ~3 V up to 3.7-3.9 V at a C rate not less than 0.5 C (70 mA/g-LCO) and not more than 1.5 C (210 mA/g-LCO);
   2) charging the cell from 3.7-3.9 V to maximum cell voltage of 4.2-4.3 V at a C rate of not less than 0.2 C (28 mA/g-LCO) and not more than 0.5 C (70 mA/g-LCO); and
   3) discharging the cell from 4.2-4.3 V to 3.7-3.9 V at a C rate of not less than 0.2 C (28 mA/g-LCO) and not more than 0.5 C (70 mA/g-LCO).

23. The method of claim 22, further comprising the steps of:
   4) charging the cell from 3.7-3.9 V to maximum cell voltage of 4.2-4.3 V at a C rate of not less than 0.5 C (70 mA/g-LCO) and not more than 0.75 C (105 mA/g-LCO); and
   5) discharging the cell from 4.2-4.3 V to 3.7-3.9 V at a C rate of not less than 0.5 C (70 mA/g-LCO) and not more than 0.75 C (105 mA/g-LCO).

24. The method of claim 23, further comprising the steps of:
   6) charging the cell from 3.7-3.9 V to maximum cell voltage of 4.2-4.3 V at a C rate of not less than 0.75 C (105 mA/g-LCO) and not more than 1.2 C (168 mA/g-LCO); and
   7) discharging the cell from 4.2-4.3 V to 3.7-3.9 V at a C rate of not less than 0.75 C (105 mA/g-LCO) and not more than 1.2 C (168 mA/g-LCO).

25. The method of claim 24, further comprising the steps of:
   8) charging the cell from 3.7-3.9 V to maximum cell voltage of 4.2-4.3 V at a C rate of not less than 1.2 C (168 mA/g-LCO) and not more than 1.5 C (210 mA/g-LCO); and
   9) discharging the cell from 4.2-4.3 V to 3.7-3.9 V at a C rate of not less than 1.2 C (168 mA/g-LCO) and not more than 1.5 C (210 mA/g-LCO).

26. The method of claim 25, further comprising the steps of:
   10) charging the cell from 3.7-3.9 V to maximum cell voltage of 4.2-4.3 V at a C rate of not less than 1.5 C (210 mA/g-LCO) and not more than 2.0 C (280 mA/g-LCO); and
   11) discharging the cell from 4.2-4.3 V to 2.5 V at a C rate not less than 0.5 C (70 mA/g-LCO) and not more than 1.5 C (210 mA/g-LCO).

27. The method of claim 1, wherein the cell comprises $Li_{1+x}Ni_yMn_zCo_{1-x-y-z}O_2$ (NMC)/graphite, wherein $0.01 \leq x \leq 0.2$ and $0.1 \leq y < 0.3$ and $0.4 < z \leq 0.65$, and the method comprises the steps of:
   1) charging the cell from open-circuit voltage (OCV) of ~3 V up to 3.9-4.1 V at a C rate not less than 0.5 C (115 mA/g-NMC) and not more than 1.5 C (345 mA/g-NMC);
   2) charging the cell from 3.9-4.1 V to maximum cell voltage of 4.3-4.5 V at a C rate of not less than 0.2 C (46 mA/g-NMC) and not more than 0.5 C (115 mA/g-NMC); and
   3) discharging the cell from 4.3-4.5 V to 3.9-4.1 V at a C rate of not less than 0.2 C (46 mA/g-NMC) and not more than 0.5 C (115 mA/g-NMC).

28. The method of claim 27, further comprising the steps of:
   4) charging the cell from 3.9-4.1 V to maximum cell voltage of 4.3-4.5 V at a C rate of not less than 0.5 C (115 mA/g-NMC) and not more than 0.75 C (172.5 mA/g-NMC); and
   5) discharging the cell from 4.3-4.5 V to 3.9-4.1 V at a C rate of not less than 0.5 C (115 mA/g-NMC) and not more than 0.75 C (172.5 mA/g-NMC).

29. The method of claim 28, further comprising the steps of:
   6) charging the cell from 3.9-4.1 V to maximum cell voltage of 4.3-4.5 V at a C rate of not less than 0.75 C (172.5 mA/g-NMC) and not more than 1.2 C (276 mA/g-NMC); and
   7) discharging the cell from 4.3-4.5 V to 3.9-4.1 V at a C rate of not less than 0.75 C (172.5 mA/g-NMC) and not more than 1.2 C (276 mA/g-NMC).

30. The method of claim 29, further comprising the steps of:
   8) charging the cell from 3.9-4.1 V to maximum cell voltage of 4.3-4.5 V at a C rate of not less than 1.2 C (276 mA/g-NMC) and not more than 1.5 C (345 mA/g-NMC); and
   9) discharging the cell from 4.3-4.5 V to 3.9-4.1 V at a C rate of not less than 1.2 C (276 mA/g-NMC) and not more than 1.5 C (345 mA/g-NMC).

31. The method of claim 30, further comprising the steps of:
   10) charging the cell from 3.9-4.1 V to maximum cell voltage of 4.3-4.5 V at a C rate of not less than 1.5 C (345 mA/g-NMC) and not more than 2.0 C (460 mA/g-NMC); and
   11) discharging the cell from 4.3-4.5 V to 2.5 V at a C rate not less than 0.5 C (115 mA/g-NMC) and not more than 1.5 C (345 mA/g-NMC).

32. The method of claim 1, wherein the cell comprises $LiNi_xFe_yAl_{1-x-y}O_2$ (NFA)/graphite, wherein $0.5 < x \leq 18$ and $0.1 \leq y < 0.4$, and the method comprises the steps of:
   1) charging the cell from open-circuit voltage (OCV) of ~3 V up to 3.7-3.9 V at a C rate not less than 0.5 C (100 mA/g-NFA) and not more than 1.5 C (300 mA/g-NFA);
   2) charging the cell from 3.7-3.9 V to maximum cell voltage of 4.2-4.3 V at a C rate of not less than 0.2 C (40 mA/g-NFA) and not more than 0.5 C (100 mA/g-NFA); and
   3) discharging the cell from 4.2-4.3 V to 3.7-3.9 V at a C rate of not less than 0.2 C (40 mA/g-NFA) and not more than 0.5 C (100 mA/g-NFA).

33. The method of claim 32, further comprising the steps of:
  4) charging the cell from 3.7-3.9 V to maximum cell voltage of 4.2-4.3 V at a C rate of not less than 0.5 C (100 mA/g-NFA) and not more than 0.75 C (150 mA/g-NFA); and
  5) discharging the cell from 4.2-4.3 V to 3.7-3.9 V at a C rate of not less than 0.5 C (100 mA/g-NFA) and not more than 0.75 C (150 mA/g-NFA).

34. The method of claim 33, further comprising the steps of:
  6) charging the cell from 3.7-3.9 V to maximum cell voltage of 4.2-4.3 V at a C rate of not less than 0.75 C (150 mA/g-NFA) and not more than 1.2 C (240 mA/g-NFA); and
  7) discharging the cell from 4.2-4.3 V to 3.7-3.9 V at a C rate of not less than 0.75 C (150 mA/g-NFA) and not more than 1.2 C (240 mA/g-NFA).

35. The method of claim 34, further comprising the steps of:
  8) charging the cell from 3.7-3.9 V to maximum cell voltage of 4.2-4.3 V at a C rate of not less than 1.2 C (240 mA/g-NFA) and not more than 1.5 C (300 mA/g-NFA); and
  9) discharging the cell from 4.2-4.3 V to 3.7-3.9 V at a C rate of not less than 1.2 C (240 mA/g-NFA) and not more than 1.5 C (300 mA/g-NFA).

36. The method of claim 35, further comprising the steps of:
  10) charging the cell from 3.7-3.9 V to maximum cell voltage of 4.2-4.3 V at a C rate of not less than 1.5 C (300 mA/g-NFA) and not more than 2.0 C (400 mA/g-NFA); and
  11) discharging the cell from 4.2-4.3 V to 2.5 V at a C rate not less than 0.5 C (100 mA/g-NFA) and not more than 1.5 C (300 mA/g-NFA).

37. The method of claim 1 wherein a total time to perform the method is less than 48 hours.

38. A battery produced by the method of claim 1, wherein the battery has no less than 95% rated capacity retention after 100 0.33C/−0.33C cycles.

39. The battery of claim 38, wherein the battery has no less than 80% rated capacity retention after 1000 0.33C/−0.33C cycles.

* * * * *